US012552931B2

(12) United States Patent
Marie et al.

(10) Patent No.: US 12,552,931 B2
(45) Date of Patent: Feb. 17, 2026

(54) DIHYDROXY LACTAM BASED POLYMERS, COMPOSITIONS AND APPLICATIONS THEREOF

(71) Applicant: ISP INVESTMENTS LLC, Wilmington, DE (US)

(72) Inventors: Bilal S. Marie, Rockaway, NJ (US); Michael A. Tallon, Aberdeen, NJ (US); Osama M. Musa, Bedminster, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 663 days.

(21) Appl. No.: 17/425,527

(22) PCT Filed: Jan. 23, 2020

(86) PCT No.: PCT/US2020/014741
§ 371 (c)(1),
(2) Date: Jul. 23, 2021

(87) PCT Pub. No.: WO2020/154471
PCT Pub. Date: Jul. 30, 2020

(65) Prior Publication Data
US 2022/0315761 A1    Oct. 6, 2022

Related U.S. Application Data

(60) Provisional application No. 62/796,934, filed on Jan. 25, 2019.

(51) Int. Cl.
| | | |
|---|---|---|
| C08L 75/12 | (2006.01) | |
| C08F 220/32 | (2006.01) | |
| C08F 222/06 | (2006.01) | |
| C08G 18/24 | (2006.01) | |
| C08G 18/28 | (2006.01) | |
| C08G 18/38 | (2006.01) | |
| C08G 18/48 | (2006.01) | |
| C08G 18/73 | (2006.01) | |
| C08G 18/75 | (2006.01) | |

(52) U.S. Cl.
CPC .......... *C08L 75/12* (2013.01); *C08F 220/325* (2020.02); *C08F 222/06* (2013.01); *C08G 18/246* (2013.01); *C08G 18/2855* (2013.01); *C08G 18/3844* (2013.01); *C08G 18/4833* (2013.01); *C08G 18/73* (2013.01); *C08G 18/755* (2013.01)

(58) Field of Classification Search
CPC .... C08L 75/12; C08F 220/325; C08F 222/06; C08G 18/246; C08G 18/2855; C08G 18/3844; C08G 18/4833; C08G 18/73; C08G 18/755; C08G 2310/00; C08G 18/0814; C08G 18/0823; C08G 18/2825; C08G 18/3275; C08G 18/348; C08G 18/6685; C08G 18/6692; C08G 18/675; C08G 18/758; C09D 175/04; C09D 175/08; C09D 175/12
See application file for complete search history.

(56) References Cited

U.S. PATENT DOCUMENTS

| | | |
|---|---|---|
| 2,882,262 A | 4/1959 | Smith et al. |
| 4,008,247 A | 2/1977 | Tucker |
| 4,189,601 A | 2/1980 | Tucker |
| 4,190,582 A | 2/1980 | Tucker |
| 4,191,833 A | 3/1980 | Tucker |
| 4,191,834 A | 3/1980 | Tucker |
| 4,439,616 A | 3/1984 | Singh et al. |
| 4,609,706 A | 9/1986 | Bode et al. |
| 5,209,347 A | 5/1993 | Fabisiewicz et al. |
| 5,252,689 A | 10/1993 | Lucas et al. |
| 5,466,770 A | 11/1995 | Audenaert et al. |
| 5,861,193 A * | 1/1999 | Goldstein .......... C08G 18/8012 528/45 |
| 6,166,236 A | 12/2000 | Bambury et al. |
| 6,369,163 B1 | 4/2002 | Pfaendner et al. |
| 6,630,599 B1 | 10/2003 | Singh et al. |
| 9,334,236 B2 | 5/2016 | Musa |
| 2007/0123673 A1 | 5/2007 | Hofer et al. |
| 2010/0171923 A1* | 7/2010 | Arnold ............... C08G 18/8116 523/105 |
| 2012/0149861 A1 | 6/2012 | Musa |
| 2013/0004667 A1 | 1/2013 | Hood et al. |
| 2015/0344461 A1 | 12/2015 | Zhang et al. |

(Continued)

FOREIGN PATENT DOCUMENTS

| | | |
|---|---|---|
| EP | 0385918 B1 | 1/1994 |
| EP | 0550744 B1 | 1/1996 |
| FR | 1286313 A * | 3/1962 |

(Continued)

OTHER PUBLICATIONS

English Translation of FR1286313A (Year: 1962).*

(Continued)

*Primary Examiner* — Mark Eashoo
*Assistant Examiner* — Cullen L G Davidson
(74) *Attorney, Agent, or Firm* — Aseem V. Mehta; Nathalie Tietcheu

(57) ABSTRACT

A lactam-functionalized polymer is disclosed. The dihydroxy lactam based polymer includes polyesters, polycarbonates, polyethers, poly (ester ethers), poly (ester amides), poly imides, polyamides, poly acrylates and poly (ester imides), and polyurethanes. The applications of the dihydroxy lactam based polymers are also disclosed.

19 Claims, No Drawings

(56) References Cited

U.S. PATENT DOCUMENTS

2018/0002480 A1\* 1/2018 Brush ................. C09D 171/02

FOREIGN PATENT DOCUMENTS

| WO | WO1991012243 A3 | 10/1991 |
| WO | WO2002042383 A3 | 8/2002 |
| WO | WO2003006568 A1 | 1/2003 |
| WO | WO2007051738 A1 | 5/2007 |
| WO | WO2008098885 A1 | 8/2008 |
| WO | WVO2008098887 A1 | 8/2008 |
| WO | WO2011022457 A1 | 2/2011 |
| WO | WO2011085280 A1 | 7/2011 |

OTHER PUBLICATIONS

PVP Polyvinylpyrrolidone Polymers, Technical Brochure, International Specialty Products.
Kim et al., Uzbek Chemical Journal, vol. 17, Issue 2, pp. 48-50, 1973.

\* cited by examiner

DIHYDROXY LACTAM BASED POLYMERS, COMPOSITIONS AND APPLICATIONS THEREOF

CROSS REFERENCE TO RELATED APPLICATIONS

This application is a U.S. National Phase filing under 35 U.S.C. § 371 of International Application No. PCT/US20/014741, filed Jan. 23, 2020, and published as WO 2020/154471 on Jul. 30, 2020 which claims benefit of priority from U.S. Provisional Patent Application Ser. No. 62/796,934, filed Jan. 25, 2019. The entire contents of each of the prior applications are incorporated herein by reference in their entirety.

FIELD OF THE INVENTION

The present application relates to dihydroxy lactam based polymers, compositions and applications thereof.

BACKGROUND OF THE INVENTION

N-vinyl lactam based polymers are those polymers having a lactam group, such as pyrrolidone or caprolactam, where the lactam nitrogen is directly bonded to the polymer backbone. These polymers, which include poly(N-vinyl-2-pyrrolidone), poly(N-vinyl-ε-caprolactam), and poly(N-vinyl-2-pyrrolidone-co-N-vinyl acetate), are available in a wide range of molecular weight, which allows them to find use in many application arts, e.g., as film formers, protective colloids, suspending agents, and many other uses. A description of these applications and properties is provided in the technical brochure "PVP Polyvinylpyrrolidone Polymers," published by International Specialty Products, which is incorporated in its entirety by reference.

The success of N-vinyl lactam polymers is attributed in part to the chemical structure of the lactam group. With its lone pair of electrons, the lactam nitrogen can form hydrogen bonds with compounds containing —OH and —NH groups. Such interactions can be manifested in a variety of properties, including adhesion (e.g., glue sticks, hair styling, tablet binder), crystallization inhibitor (e.g., gas hydrates, sucrose solutions), and complexation agent (e.g., dyes, active ingredients).

In addition to the molecular weight, the number of carbon atoms in the lactam ring can be varied. Commonly known lactams include those from three carbon atoms/one nitrogen atom in the ring (propiolactam) up to six carbon atoms/one nitrogen atom in the ring (heptanolactam). Increasing the number of carbon atoms in the ring alters the molecule's water hydrophilicity/hydrophobicity balance. Although both poly(N-vinyl-2-pyrrolidone) and poly(N-vinyl-ε-caprolactam) are water soluble, the former is more hydrophilic, absorbing more water in humid environments than the latter.

However, the available ranges in lactam ring size and polymer molecular weight are insufficient to design new monomers and polymers with truly new functionality. For example, because the nitrogen atom of N-vinyl lactams is directly attached to the polymer backbone without a spacer group, there are limited options to modulate the hydrophilicity/hydrophobicity balance of the molecule, or to alter a relatively high glass transition temperature [e.g., about 180° C. for poly(N-vinyl-2-pyrrolidone)]. A new approach is needed that alters the structure of the N-vinyl lactam structure to facilitate new properties and end user applications.

To attain different properties current technology relies on copolymerizing other monomer units together with the N-vinyl lactam unit. Many such non-homopolymers are known, and include those formed with N-vinyl acetate, styrene, dimethylaminoethylmethacrylate, dimethylaminopropylmethacrylamide, acrylic acid, and lauryl methacrylate. A number of properties can be altered through these copolymerization, including hydrophobicity/hydrophilicity, film formation, flexibility, foaming ability, humidity response, viscosity, gloss, and tack. While copolymerization produce valuable products, they are, in essence, pursued when the homopolymer cannot provide the desired properties. Desired are new lactam-based monomers and polymers thereof that offer expanded functionality.

In addition to functionality limitations, N-vinyl lactam based polymers require production methods and analytical testing to ensure sufficiently low residual monomer. Needed are next-generation lactam-based compounds that provide new properties and also are free of N-vinyl lactam monomer.

There is a related family of compounds, also based on N-alkyl lactams that help extend the lactam moiety, in which an alkyl group is covalently bonded to the lactam nitrogen. Various N-alkyl lactams are known, and include but not limited to N-methyl-2-pyrrolidone, N-ethyl-2-pyrrolidone, N-hydroxyethyl-2-pyrrolidone, N-cyclohexyl-2-pyrrolidone, N-octyl-2-pyrrolidone, and N-dodecyl-2-pyrrolidone, all of which are offered for commercial sale by Ashland LLC (Bridgewater, NJ). Also known is N-hydroxymethyl-2-caprolactam (Benson, 1948). These non-polymeric chemicals find application as solvents, surface tension reducers, and low-foaming surface wetting agents.

The prior art teaches several modified N-vinyl lactams via N-alkyl lactams. These documents include: U.S. Pat. Nos. 2,882,262; 4,008,247; 4,189,601; 4,190,582; 4,191,833; 4,191,834; 4,439,616; 4,609,706; 5,209,347; 5,252,689; 5,466,770; 6,369,163; 6,630,599; and US patent applications: 2007/123,673; and foreign patents: EP385,918; EP550,744; and foreign patent applications: WO91/12243; WO02/42383; WO03/006568; WO2007/051738; WO 2008/098885; WO 2008/098887; WO 2011/022457; WO 2011/085280; and WO 2011/022457. Many of these publications describe various esters of N-hydroxyalkyllactams, such as N-hydroxyethylpyrrolidone.

1-(2,3-dihydroxypropyl)pyrrolidin-2-one based lipids are described in WO 2011/056682.

Also, linear oligo and polyurethanes with pyrrolidinone side rings are described by Kim et al. (Uzbek Chemical Journal, Volume 17, Issue 2, Pages 48-50, 1973).

SUMMARY OF THE INVENTION

One objective of the present application relates to a polymer obtained from a reaction mixture comprising: (i) at least one dihydroxy lactam moiety; and (ii) at least one functional moiety having a hydroxyl-reactive functional group; wherein (i) and (ii) are independently present in amounts of about 0.01 mole % to about 99.99 moles % and the polymer is selected from the group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane.

One of the objectives of the present application relates to a polymer obtained from a reaction mixture comprising: (i) at least one dihydroxy lactam moiety or a modified dihydroxy lactam moiety with a reactive functional group; the modified dihydroxy lactam moiety can be constructed from esters, epoxies, ethers, urethanes, acrylates, anhydrides and combinations thereof, as additional functional groups attached to the dihydroxy lactam moiety and (ii) at least one functional moiety having a hydroxyl-reactive or a modified hydroxyl reactive functional group; wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates, poly (ester imide), and polyurethanes.

Another objective of the present application relates to a polymer obtained from a reaction mixture comprising: (i) a dihydroxy lactam moiety selected from the group consisting of:

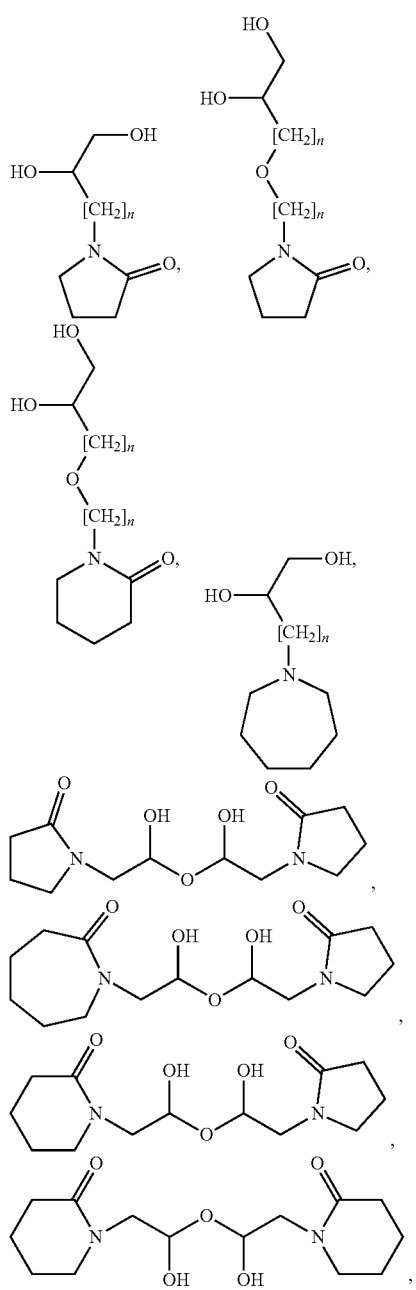

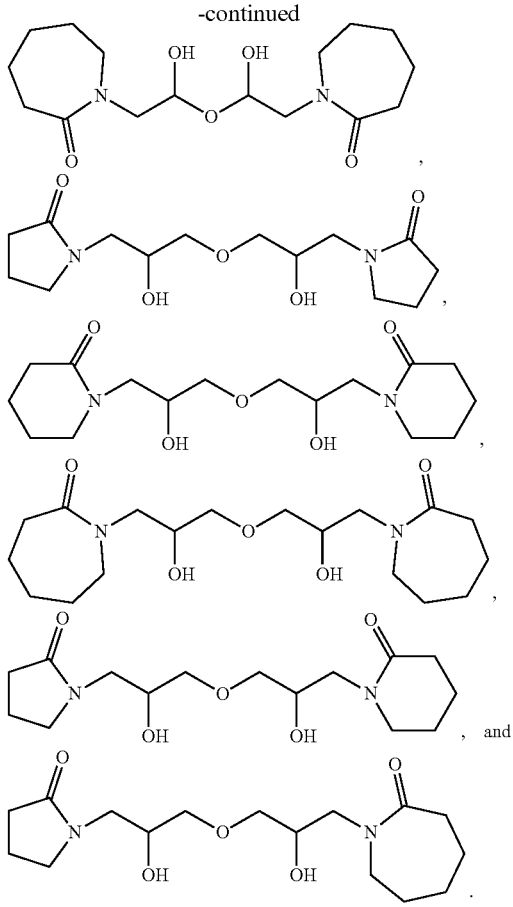

wherein n is an integer ranging from 1 to 6; and (ii) at least one functional moiety having a hydroxyl-reactive functional group, wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane.

One more objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) poly(D, L-lactide); wherein (i) and (ii) independently present in amount of about 0.01 mole % to about 99.99 moles % and the polymer is a polyester.

Another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) diphenyl carbonate; wherein (i) and (ii) are independently present in amounts of about 0.01 mole % to about 99.99 moles % and the polymer is a polycarbonate.

Yet another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, (ii) dibromo ethane, (iii) glycidyl ether; wherein (i), (ii) and (iii) are independently present in amounts of about 0.01 mole % to about 99.99 moles % and the polymer is a polyether.

Still another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) 1,4-dibromobutane and reacting thr product of (i) and (ii) with adipoyl chloride or adipic acid; wherein (i), (ii) and (iii) are independently present in amounts of about 0.01 mole % to about 99.99 moles % and the polymer is a polyester ether.

A different objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) α-amino acids under p-toluene sulfonic acid; wherein the product of (i) and (ii) is reacted with (iii) bis(p-nitrophenyl succinate) and (i), (ii) and (iii) are independently present in the amounts of about 0.01 mole % to about 99.99 moles % and the polymer is a polyester amide.

Another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) p-fluoronitrobenzene; wherein the product of (i) and (ii) is further hydrogenated to make the diamine (iii) and is reacted with (iv) pyromellitic dianhydride and (i), (ii) and (iv) are independently present in amounts of about 0.01 mole % to about 99.99 moles % and the polymer is a polyimide.

One more objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) p-fluoronitrobenzene; wherein the product of (i) and (ii) is further hydrogenated to make the diamine (iii) and is reacted with (iv) adipoyl chloride or adipic acid, and (i), (ii) and (iv) are independently present in amounts of about 0.01 mole % to about 99.99 moles % and the polymer is a poly amide.

Yet another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) methacryloyl chloride; wherein the product of (i) and (ii) is reacted with (iii) methyl methacrylate and (i), (ii) and (iii) are independently present in amounts of about 0.01 mole % to about 99.99 moles % and the polymer is a poly acrylate.

Still another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) p-fluoronitriphenyl; wherein the product of (i) and (ii) is further hydrogenated to make the diamine (iii) and is reacted with (iv) N-(4-chloro carbonyl phenyl) trimellitimide acid chloride and (i), (ii) and (iv) are independently present in amounts of about 0.01 mole % to about 99.99 moles % and the polymer is a polyester imide.

Another objective of the present application relates to a polymer obtained from a reaction mixture comprising: (i) N-(2,3-dihydroxypropyl)-2-pyrrolidone and/or 1-[2-(2,3-dihydroxypropyloxy)ethyl]-2-pyrrolidone, and (ii) a) isophorone diisocyanate, b) polyethylene glycol, and optionally c) octanol; wherein each (i) and (ii) is present in amounts of other than 50 mole % and the polymer is a polyurethane.

One more objective of the present application relates to a composition comprising: (I) a polymer obtained from a reaction mixture comprising: (i) at least one dihydroxy lactam moiety, and (ii) at least one functional moiety having a hydroxyl-reactive functional group, wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane, and (II) one or more additives.

Another objective of the present application relates to a personal care composition comprising: (I) a polymer obtained from a reaction mixture comprising: (i) at least one dihydroxy lactam moiety, and (ii) at least one functional moiety having a hydroxyl-reactive functional group; wherein (i) and (ii) are independently present in amount of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane, and (II) one or more cosmetically acceptable additives.

Another objective of the present application relates to a coating composition comprising: (I) a polymer obtained from a reaction mixture comprising: (i) at least one dihydroxy lactam moiety, and (ii) at least one functional moiety having a hydroxyl-reactive functional group; wherein (i) and (ii) are independently present in amount of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane, and (II) one or more coating additives.

Another objective of the present application relates to a pharmaceutical composition comprising: (I) a polymer obtained from a reaction mixture comprising (i) N-(2,3-dihydroxypropyl)-2-pyrrolidone and/or 1-[2-(2,3-dihydroxypropyloxy)ethyl]-2-pyrrolidone; and (ii) poly(D,L-lactide); wherein (i) and (ii) are independently present in amount of about 0.01 mole % to about 99.99 moles % and the polymer is a polyester, and (II) one or more pharmaceutically acceptable additives.

One more objective of the present application relates to a process of preparing a polymer comprising: (A) (i) at least one dihydroxy lactam moiety, and (ii) at least one functional moiety having a hydroxyl-reactive functional group; wherein (i) and (ii) are independently present in amount of about 0.01 mole % to about 99.99 moles % and the polymer is selected from the group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane; (B) charging (A) into a reaction container under inert gas atmosphere with solvent; (C) stirring the reaction mixture of (B) and maintaining temperature at 55-70° C. for about 30 minutes; (D) charging an additional reactive moiety to (C); (E) polymerizing (D) with catalyst for 3-5 hours; and (F) retrieving desired polymer from (E).

Still another objective of the present application relates a process of preparing a polymer comprising: (A) (i) at least one dihydroxy lactam moiety, and (ii) at least one functional moiety having a hydroxyl-reactive functional group, wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane; (B) charging (A) into a reaction container under inert gas atmosphere; (C) stirring the reaction mixture of (B) and maintaining temperature at 65-80° C. for about 30 minutes; (D) charging an additional reactive moiety to (C); (E) polymerizing (D) with catalyst; (F) increasing temperature of (E) to 90°-110° C. and maintaining the temperature for about 2-3 hours; and (G) retrieving desired polymer from (F).

DETAILED DESCRIPTION OF THE INVENTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations can be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" can mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value can vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached. In addition, the quantities of 100/1000 are not to be considered limiting as lower or higher limits can also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purposes of differentiating between two or more items and, unless otherwise stated, is not meant to imply any sequence or order or importance to one item over another or any order of addition.

References herein to "one embodiment," or "one aspect" or "one version" or "one objective" or "another embodiment," or "another aspect" or "another version" or "another objective" of the invention can include one or more of such embodiment, aspect, version or objective, unless the context clearly dictates otherwise.

The term "at least one" refers to one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached.

All percentages, parts, proportions, and ratios as used herein are by weight of the total composition, unless otherwise specified. All such weights as they pertain to listed ingredients are based on the active level and therefore do not include solvents or by-products that can be included in commercially available materials, unless otherwise specified.

All references to singular characteristics or limitations of the present invention shall include the corresponding plural characteristics or limitations, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that can vary depending upon the desired properties to be obtained in carrying out the invention.

The term "or combinations thereof", "and combinations thereof", and "combinations thereof" as used herein refers to all permutations and combinations of the listed items preceding the term.

The term "about" refers to a range of values+10% of a specified value. For example, the phrase "about 200" includes ±10% of 200, or from 180 to 220.

The term "monomer" refers to a small molecule that chemically bonds during polymerization to one or more monomers of the same or different kind to form a polymer.

The term "polymerization" or "polymerizing" refers to methods for chemically reacting monomer compounds to form polymer chains. The polymer chain can be alternating, blocked, or random. The type of polymerization method can be selected from a wide variety of methods and include the following non-limiting examples: poly condensation, step growth polymerization, and free radical polymerization.

The term "macromolecule" refers to any large molecule, which includes polymers.

The term "polymer" refers to a large molecule comprising one or more types of monomer residues (repeating units) connected by covalent chemical bonds. Non-limiting examples of polymers include homopolymers, and non-homopolymers such as copolymers, terpolymers, tetrapolymers and the higher analogues.

The term "heteroatom" refers to oxygen, nitrogen, sulfur, silicon, phosphorous, or halogen. The heteroatom(s) can be present as a part of one or more heteroatom-containing functional groups. Non-limiting examples of heteroatom-containing functional groups include ether, hydroxyl, epoxy, carbonyl, carboxamide, carboxylic ester, carboxylic acid, imine, imide, amine, sulfonic, sulfonamide, phosphonic, and silane groups. The heteroatom(s) can also be present as a part of a ring such as in heteroaryl and heteroarylene groups.

The term "moiety" refers to a part or a functional group of a molecule.

The term "lactam" refers to groups having the structure:

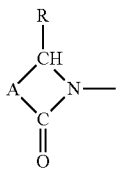

wherein A is a functionalized or unfunctionalized alkylene or alkenylene group comprising 2 to 50 carbon atoms, wherein 2 to 4 carbon atoms reside in the lactam ring between the

group and the

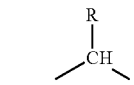

group; and R is selected from the group consisting of hydrogen, functionalized and unfunctionalized alkyl, cycloalkyl, alkenyl, and aryl groups, wherein any of the groups can be with or without heteroatoms.

The lactam-containing moiety can comprise a general lactam structure including β-lactam, γ-lactam, δ-lactam and ε-lactam. In one non-limiting embodiment, the lactam-containing moiety can comprise a lactam structure including β-propiolactam, γ-butyrolactam, δ-valerolactam and ε-caprolactam.

The term "alkyl" refers to a functionalized or unfunctionalized monovalent straight-chain, branched-chain or cyclic C1-C60 group optionally having one or more heteroatoms. Particularly, an alkyl is a C1-C45 group and more particularly, a C1-C30 group. Particular, yet non-limiting examples of alkyl groups include methyl, ethyl, n-propyl, isopropyl, n-butyl, isobutyl, tert-butyl, cyclobutyl, n-pentyl, isopentyl, cyclopentyl, n-hexyl, cyclohexyl, n-heptyl, cyclyheptyl, methylcyclohexyl, n-octyl, 2-ethylhexyl, tert-octyl, iso-norbornyl, n-dodecyl, tert-dodecyl, n-tetradecyl, n-hexadecyl, n-octadecyl, and n-eicosyl.

The term "branched and unbranched alkyl groups" refers to alkyl groups, which can be straight chained or branched. For example, the alkyl groups have from 1 to about 60 carbon atoms, more particularly, from 1 to about 30 carbon atoms, and yet more particularly from 1 to about 6 carbon atoms. Branched groups include isopropyl, tert-butyl, and the like.

The term "alkylene" refers to a functionalized or unfunctionalized divalent straight-chain, branched-chain or cyclic $C_1$-$C_{50}$ group optionally having one or more heteroatoms. Particularly, an alkylene is a $C_1$-$C_{45}$ group and more particularly, a $C_1$-$C_{30}$ group. In particular, yet non-limiting examples of alkylene groups include —CH$_2$—, —CH$_2$—CH$_2$—, —CH(CH$_3$)—CH$_2$—, —CH$_2$—CH(CH$_3$)—, —C(CH$_3$)$_2$—CH$_2$—, —CH$_2$—C(CH$_3$)$_2$—, —CH(CH$_3$)—CH(CH$_3$)—, —C(CH$_3$)$_2$—C(CH$_3$)$_2$—, —CH$_2$—CH$_2$—CH$_2$—, —CH(CH$_3$)—CH$_2$—CH$_2$—, —CH$_2$—CH(CH$_3$)—CH$_2$—, —CH$_2$—CH$_2$—CH(CH$_3$)—, —CH$_2$—CH$_2$—CH$_2$—CH$_2$—, —CH$_2$—CH$_2$—CH$_2$—CH$_2$—CH$_2$—, —CH$_2$—CH$_2$—CH$_2$—CH$_2$—CH$_2$—CH$_2$—, —CH$_2$—CH$_2$—CH$_2$—CH$_2$—CH$_2$—CH$_2$—CH$_2$—, cyclopropylene, cyclobutylene, cyclopentylene, cyclohexylene, and the like.

The term "aryl" refers to a functional group derived from an aromatic hydrocarbon. The aromatic hydrocarbon can be mononuclear or polynuclear. Examples of aryl group of the mononuclear type include phenyl, tolyl, xylyl, mesityl, cumenyl, and the like. Examples of aryl group of the polynuclear type include naphthyl, anthryl, phenanthryl, and the like. The aryl group can have at least one substituent selected from halogen, hydroxy, cyano, carboxy, carbamoyl, nitro, amino, aminomethyl, lower alkyl, lower alkoxy, mercapto, trichloroethyl, or trifluoromethyl. Examples of such substituted aryl groups include 2-fluorophenyl, 3-nitrophenyl, 4-nitrophenyl, 4-methoxyphenyl, 4-hydroxyphenyl, and the like.

The term "cycloalkyl group" refers to a non-aromatic mono- or multicyclo ring system having from about 3 to about 10 carbon atoms. The cycloalkyl group can be partially unsaturated. The cycloalkyl group can also be substituted with an alkyl group substituent as defined herein. The cycloalkyl chain can contain an oxygen, sulfur, or substituted or unsubstituted nitrogen atom, wherein the nitrogen substituent can be hydrogen, alkyl, substituted alkyl, aryl, or substituted aryl, thus providing a heterocyclo group. Representative monocyclo cycloalkyl rings include, but are not limited to, cyclopropyl, cyclobutyl, cyclopentyl, cyclohexyl, cycloheptyl, and the like. Further, the cycloalkyl group can be substituted with a linking group, such as an alkyl group, alkylene group, and the like, to form cyclopropylmethyl group, cyclobutylmethyl group, and the like. The cycloalkyl group can also be a multicyclo cycloalkyl rings such as adamantyl, octahydronaphthyl, decalin, camphor, camphane, and noradamantyl.

The term "functionalized" refers to the state of a moiety that has one or more functional groups introduced to it by way of one or more functionalization reactions known to a person having ordinary skill in the art. In particular, yet non-limiting examples of functionalization reactions include epoxidation, sulfonation, hydrolysis, amidation, esterification, hydroxylation, dihyroxylation, amination, ammonolysis, acylation, nitration, oxidation, dehydration, elimination, hydration, dehydrogenation, hydrogenation, acetalization, halogenation, dehydrohalogenation, michael addition, aldol condensation, canizzaro reaction, mannich reaction, clasien condensation, suzuki coupling, and the like. Particularly, functionalization of a moiety replaces one or more hydrogens in the moiety with one or more non-hydrogen groups, for e.g., alkyl, alkoxyl, cycloalkyl, alkenyl, cycloalkenyl, alkynyl, and/or aryl groups. Particular, yet non-limiting examples of cycloalkyl groups include cyclopentane, cyclohexane, cycloheptane, and the like. Particular, yet non-limiting examples of alkoxy groups include methoxy, ethoxy, n-propoxy, isopropoxy, and the like. Particular, yet non-limiting examples of aryl groups include benzenes, naphthalenes (2 rings), anthracenes (3 rings), and the like.

The terms "pharmaceutically acceptable" and "cosmetically acceptable" refer to molecular entities and compositions that are generally regarded as safe. Particularly, as used herein, the term "pharmaceutically acceptable" and "cosmetically acceptable" refer to approved by a regulatory agency of the appropriate governmental agency or listed in the U.S. Pharmacopoeia or other generally recognized pharmacopoeia for use in animals, and more particularly in humans.

The term "pharmaceutically active ingredient" refers to any ingredient considered to have a therapeutic effect when delivered to a subject in need thereof and further being regulated by drug authorities like CDER, EMEA, TAG etc. Pharmaceutically active ingredients can act systemically upon oral consumption, or locally such as when present in the buccal cavity, on the skin, etc. They can also be delivered across the skin as in transdermal drug delivery systems.

All percentages, ratio, and proportions used herein are based on a weight basis unless other specified.

The present disclosure is directed to a polymer obtained from a reaction mixture comprising (i) at least one dihydroxy lactam moiety and (ii) at least one functional moiety having a hydroxyl-reactive functional group; wherein (i) and (ii) are independently present in amounts of about 0.01 mole % to about 99.99 moles % and the polymer is selected from the group consisting of polyester, polycarbonate, polyether, poly (ester ether), poly (ester amide), poly imide, polyamide, poly acrylate and poly (ester imide); or wherein each (i) and (ii) is present in an amount of other than 50 mole % and the polymer is a polyurethane.

According to one of the embodiments, the dihydroxy lactam moiety has a structure:

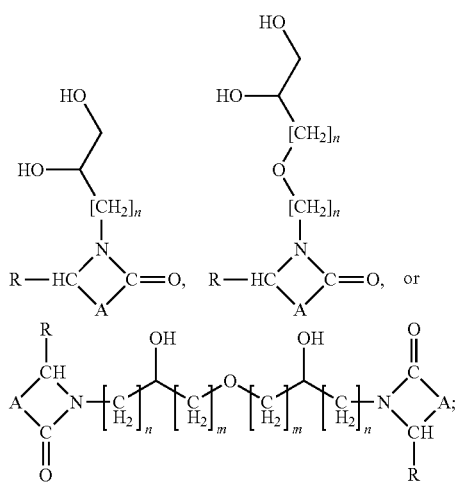

wherein "R" is independently selected from the group consisting of hydrogen, and functionalized and unfunctionalized alkyl, cycloalkyl, alkenyl, and aryl groups, wherein any of the afore mentioned groups can be with or without heteroatoms and linear or branched; "A" is an alkylene or alkenylene group comprising 2 to 50 carbon atoms; wherein 2 to 4 carbon atoms reside in the lactam ring between the

group and the

group

"n" is an integer ranging from 1 to 55; and "m" is an integer ranging from 0 to 5.

More particularly, each A in the lactam ring between the

group and the

group can be independently selected from the group consisting of

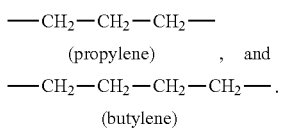

More particularly, each A in the lactam ring between the

group and the

group can be independently —CH$_2$—CH$_2$— or +CH$_2$—CH$_2$—CH$_2$—CH$_2$—.

More particularly, each R can be independently selected from the group consisting of hydrogen, functionalized and unfunctionalized alkyl, cycloalkyl, alkenyl, and aryl groups containing 1-10 carbon atoms, wherein any of the groups can be with or without heteroatoms. More particularly, each R can contain 1-8 carbon atoms. Most particularly each R can contain 1-6 carbon atoms.

Non-limiting examples of the dihydroxy lactam moiety include

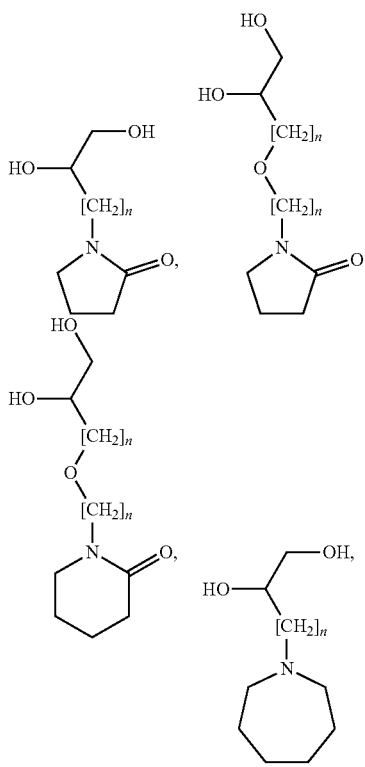

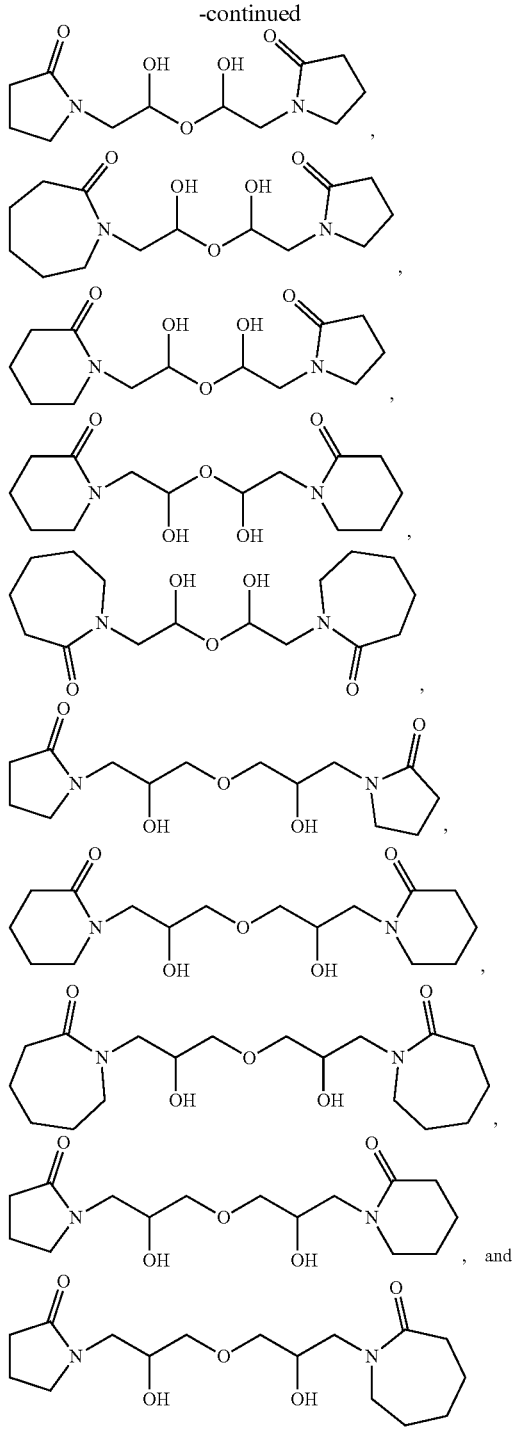

wherein n is an integer ranging from 1 to 6 and "m" is an integer ranging from 0 to 6.

According to one of the embodiments, the dihydroxy lactam moiety compound is selected from the group consisting of N-(2,3-dihydroxypropyl)-2-pyrrolidone, 1-[2-(2,3-dihydroxypropyloxy)ethyl]-2-pyrrolidone, and a combination thereof.

According to yet another embodiment, the dihydroxy lactam moiety compound is present in an amount from about 0.01% to about 99.99% by weight of the total reaction mixture. In another embodiment, other possible ranges of dihydroxy lactam moiety compound would include, but are not limited to, from about 0.1 wt. % to about 10 wt. % wt. %; from about 10 wt. % wt. % to about 20 wt. % wt. %; from about 20 wt. % to about 30 wt. %; from about 30 wt. % to about 40 wt. %; from about 40 wt. % to about 50 wt. %; from about 50 wt. % to about 60 wt. %; from about 60 wt. % to about 70 wt. %; from about 70 wt. % to about 80 wt. %; from about 80 wt. % to about 90 wt. %; or from about 90 wt. % to about 99.99 wt. %.

According to one of the embodiments the functional moiety having a hydroxyl-reactive functional group is selected from the group consisting of: (a) carbamates, (b) acyl halides, (c) sulfonyl halides, (d) isothiocyanates, (e) cyanoacrylates, (f) isocyanates, (g) oxiranes, (h) imines, (i) thiocarbonates, (j) thiols, (k) aldehydes, (l) aziridines, (m) acids and their anhydrides, (n) azides, (o) phosphorus halides with alcohols, (p) esters, (q) amines, (r) alkyl halides, (s) dihalogenomethanes and combinations thereof.

According to another embodiment, the carbamate is selected from the group consisting of hydroxyethyl carbamate, hydroxypropyl carbamate, hydroxybutyl carbamate and combinations thereof.

According to one embodiment, the acyl halide compound is selected from the group consisting of acryloyl chloride, succinyl chloride, methacryloyl chloride, crotonoyl chloride, benzoyl chloride, cinnamoyl chloride, hydrocin namoyl chloride, acetyl chloride, 2-acetoxyacetyl chloride, diphenylacetyl chloride, 2-methoxybenzoyl chloride, 3,4,5 trimethoxybenzoyl chloride, 3,4 (methylenedioxy)benzoyl chloride, cyclopropanecarbonyl chloride, pentadecenoyl chloride, 2-cyclohexene-1-carbonyl chloride, 2-thiopheneacetyl chloride and combinations thereof.

According to another embodiment, the sulfonyl halide compound is selected from the group consisting of methane sulfonyl chloride, benzenesulfonyl chloride and combinations thereof.

According to another embodiment, the isothiocyanate compound is selected from the group consisting of methyl isothiocyanate, allyl isothiocyanate, aryl isothiocyanates and combinations thereof.

According to another embodiment, the cyanoacrylate compound is selected from the group consisting of ethyl cyanoacrylate, N-butyl-cyanoacrylate (NBCA), 2-ocytyl-cyanoacrylate (2-OCA) and combinations thereof.

According to another embodiment, the isocyanate compound is selected from the group comprising of hexamethylene diisocyanate, toluene diisocyanate (TDI), diphenylmethane diisocyanate (MDI), m-phenylene diisocyanate, p-phenylene diisocyanate, bitolylene diisocyanate, cyclohexane diisocyanate (CHDI), bis-(isocyanatomethyl) cyclohexane (H6XDI), dicyclohexylmethane diisocyanate (H12MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives, polymethylene polyphenyl isocyanates, chlorophenylene-2,4-diisocyanate, polyphenylene diisocyanate, isophorone diisocyanate (IPDI), hydrogenated methylene diphenyl isocyanate (HMDI), tetramethyl xylene diisocyanate (TMXDI), hexamethylene diisocyanate (HDI), and their respective dimers, trimers and oligomers and combinations thereof.

According to another embodiment, the oxirane compound is selected from the group consisting of ethylene oxide (EO), propylene oxide (PO), butylene oxide, 1-octene oxide, cyclohexene oxide, styrene oxide, bisphenol A diglycidyl ether, diglycidyl ether, epichlorohydrin, glycidic acid, allyl glycidyl ether ([(2-propenyloxy)methyl]-oxirane), glycidyl (meth)acrylate, vinylcyclohexene diepoxide, 3,4-epoxycyclohexylmethyl 3,4-epoxycyclohexane carboxylate, 3,4-epoxy-6-methylcyclohexylmethyl 3,4-epoxy-6-methylcyclohexane carboxylate, dipentene dioxide, 2-(3,4-epoxycyclohexyl-5,5-spiro-3,4-epoxy)cyclohexane metadioxane, and combinations thereof.

According to another embodiment, the imine compound is selected from the group consisting of polyaldimines, hydroxyaldimines, polyketimines, hydroxyketimines, and combinations thereof.

According to another embodiment, the thiocarbonate compound is selected from the group consisting of bis-(phenylthiocarbonyloxymethyl) esters, bis-(isopropylthiocarbonyloxymethyl) esters, and combinations thereof.

According to another embodiment, the thiol compound is selected from the group consisting of glutathione, 3-acetyl-thiol propionic acid, thio anhydride, thio acid, and combinations thereof.

According to another embodiment, the aldehyde compound is selected from the group consisting of acetaldehyde diethyl acetyl, propionaldehyde diethyl acetyl, di(acetaldehyde diethylacetal), chloroacetaldehyde diethyl acetal, and combinations thereof.

According to another embodiment, the aziridine compound is selected from the group consisting of 2,2-bishydroxymethylbutanol tris[3-(1-aziridinyl)propionate], bis-N-aziridinomethane, and combinations thereof.

According to another embodiment, the acid and their anhydride compound is selected from the group consisting of maleic acid, maleic anhydride, fumaric acid, citric acid, alkenylsuccinic anhydrides, phthalic anhydride, terephthalic acid, succinic anhydride, tetrahydrophthalic anhydride, maleic anhydride copolymers, and combinations thereof.

According to another embodiment, the azide compound is selected from the group consisting of azide-functionalized DNA, azide-functionalized peptides, azide-functionalized proteins, azide-functionalized sugars, azide-functionalized metal, azide-functionalized nanoparticles, azide-functionalized antimicrobials, isodium 4,4'-diazidostilbene-2,2'-disulfonate, aromatic bisazide compound, calcium azide, 4,4-diphenyldisulfonyl azide and p-toluenesulfonyl azide, and combinations thereof.

According to another embodiment the phosphorus oxyhalide compound is selected from the group consisting of phosphorus oxychloride, phosphorus oxybromide, and combinations thereof.

According to another embodiment, the ester compound is selected from the group consisting of dimethyl itaconate, di-n-butyl itaconate, vinyl hexanoate, glycolide, ε-caprolactone, γ-caprolactone, poly(D,L-lactide), poly(D-lactide), poly (L-lactide), poly(ε-caprolactone), poly (γ-caprolactone), polyglycolide, valerolactone, butralactone, polyetherpolyester, poly-anhydride-diol-polyester, and combinations thereof.

According to another embodiment, the amine compound is selected from the group consisting of amino alcohols, methylamine, ethylamine, hexylamine, isopropylamine, isobutylamine, amylamines, cyclohexylamine, octylamine, benzylamine, dimethylamine, diethylamine, dipropylamine, dibutylamine, diphenylamine, dibenzylamine, ethylmethylamine, N-methylaniline, ethylenediamine, propylenediamine, butylenediamine, hexamethylenediamine, cyclohexylenediamine, piperazine, toluenediamine, isophoronediamine, N,N-dimethylaniline, N,N-dimethyl-1-naphthylamine, N,N-dimethyl-p-toluidine, N,N-diethylaniline, N,N-diallylaniline, 1-phenylpiperidine, and 4-phenylmorpholine, amino-ethoxylates, cocamine, soyamine and combinations thereof.

According to another embodiment, the alkyl halide compound is selected from the group consisting of bromohexanes, bromododecane, bromohexadecane, 1-bromooctadecane and combinations thereof.

According to another embodiment, the dihalogenomethane compound is selected from the group consisting of dibromomethane, dichloromethane and combinations thereof.

According to yet another embodiment, the functional moiety having a hydroxyl-reactive functional group is present in an amount from about 0.01% to about 99.99% by weight of the total reaction mixture. In another embodiment, other possible ranges of functional moiety having a hydroxyl-reactive functional group would include, but are not limited to, from about 0.1 wt. % to about 10 wt. %; from about 10 wt. % to about 20 wt. %; from about 20 wt. % to about 30 wt. %; from about 30 wt. % to about 40 wt. %; from about 40 wt. % to about 50 wt. %; from about 50 wt. % to about 60 wt. %; from about 60 wt. % to about 70 wt. %; from about 70 wt. % to about 80 wt. %; from about 80 wt. % to about 90 wt. %; or from about 90 wt. % to about 99.99 wt. %.

The present disclosure is also directed to a polymer obtained from a reaction mixture comprising (i) 0.01 mole % to about 99.99 moles % of at least one dihydroxy lactam moiety, and (ii) 0.01 mole % to about 99.99 moles % of at least a functional moiety having a hydroxyl-reactive functional group; wherein the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane.

According to another embodiment, the reaction mixture further comprises one or more non-lactam moiety.

According to another embodiment, the non-lactam moiety is selected from selected from the group comprising of functionalized/unfunctionalized compounds; aliphatic/aromatic alcohols with a carbon chain length of $C_1$-$C_{18}$, alkoxylated alcohols with a carbon chain length of $C_1$-$C_{18}$ alcohol, ethylene glycols, alcohol meth(acrylates), polyvinyl alcohols, polycarbonatepolyols, polybutylene glycols, polyethylene glycol, polypropylene glycols, hydroxypolyesters, hydroxypolyethers, hydroxypolythioesters, hydroxypolyacetals, hydroxypolycarbonates, polyetherpolyols, polyesterpolyols, polycarbonatepolyols, hydroxypolyesters, hydroxypolyethers, hydroxypolythioesters, hydroxypolyacetals, hydroxypolycarbonates, aliphatic and aromatic polyether polyols, caprolactone-based polyols, poly(ethylene glycol)-soyamine, poly(ethylene glycol)-castor oil, poly(ethylene glycol)-hydrogenated castor oil, poly(ethylene glycol)-lanolin, poly(ethylene glycol)-lanolin wax, poly(ethylene glycol)-polyvinylidene fluoride, poly(ethylene glycol)-poly(vinyl acetate), poly(ethylene glycol)-polyoxymethylene, poly(ethylene glycol)-ester, and combinations thereof.

According to yet another embodiment, the non-lactam moiety compound is present in an amount from about 0.01% to about 99.98% by weight of the total reaction mixture. In another embodiment, other possible ranges of non-lactam moiety would include, but are not limited to, from about 0.1 wt. % to about 10 wt. %; from about 10 wt. % to about 20 wt. %; from about 20 wt. % to about 30 wt. %; from about 30 wt. % to about 40 wt. %; from about 40 wt. % to about 50 wt. %; from about 50 wt. % to about 60 wt. %; from about 60 wt. % to about 70 wt. %; from about 70 wt. % to about 80 wt. %; from about 80 wt. % to about 90 wt. %; or from about 90 wt. % to about 99.98 wt. %.

Molecular weight of the dihydroxy lactam functionalized polymer is in the range of from about 3,000 g/mol to about 1,000,000 g/mol. Other preferred molecular weight ranges would include, but are not limited to, about 10,000 g/mol to about 100,000 g/mol; about 100,000 g/mol to about 200,000 g/mol; about 200,000 g/mol to about 300,000 g/mol; about 300,000 g/mol to about 400,000 g/mol; about 400,000 g/mol to about 500,000 g/mol; about 500,000 g/mol to about 600,000 g/mol; about 600,000 g/mol to about 700,000 g/mol; about 700,000 g/mol to about 800,000 g/mol; about 800,000 g/mol to about 900,000 g/mol; and/or about 900,000 g/mol to about 1000,000 g/mol.

The present disclosure is also directed to a polymer obtained from a reaction mixture comprising (i) N-(2,3-dihydroxypropyl)-2-pyrrolidone and/or 1-[2-(2,3-dihydroxypropyloxy)ethyl]-2-pyrrolidone, and (ii) poly(D, L-lactide); wherein (i) and (ii) are independently present in amounts of about 0.01 mole % to about 99.99 mole % and the polymer is a polyester.

The present disclosure is further directed to a polymer obtained from a reaction mixture comprising (i) N-(2,3-dihydroxypropyl)-2-pyrrolidone and/or 1-[2-(2,3-dihydroxypropyloxy)ethyl]-2-pyrrolidone, and (ii) a) isophorone diisocyanate, b) polyethylene glycol, and optionally c) octanol; wherein each (i) and (ii) is present in amounts of other than 50 mole % and the polymer is a polyurethane.

The type of polymerization method used to prepare the polymers of this invention include, but are not limited to, poly condensation, step growth polymerization and free radical polymerization.

Non-limiting illustrative examples of structures of polymers of the invention, prepared as set out below, by reacting: (i) at least one dihydroxy lactam moiety, and (ii) at least one functional moiety having a hydroxyl-reactive functional group; wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane, include the following:

PDIOL-DIOL-Diisocyanate based polyurethanes:

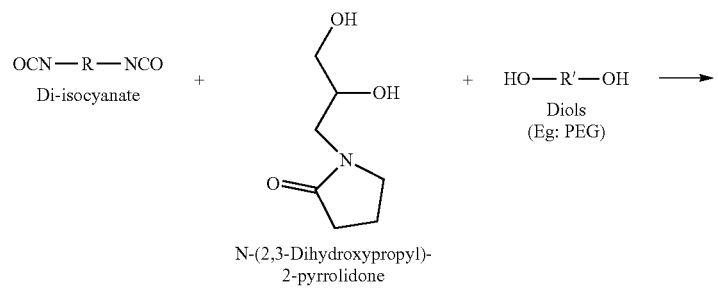

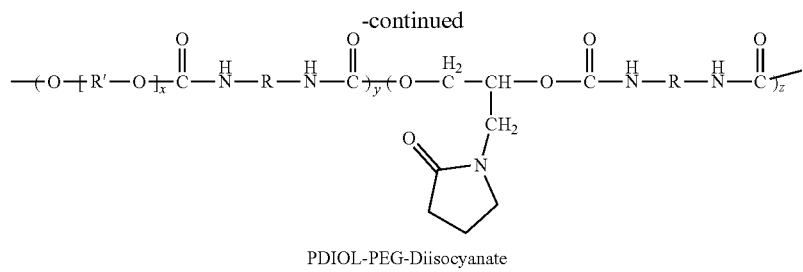
PDIOL-PEG-Diisocyanate
wherein x+y+z=100.
EPDIOL-DIOL-Diisocyanate based polyurethanes:
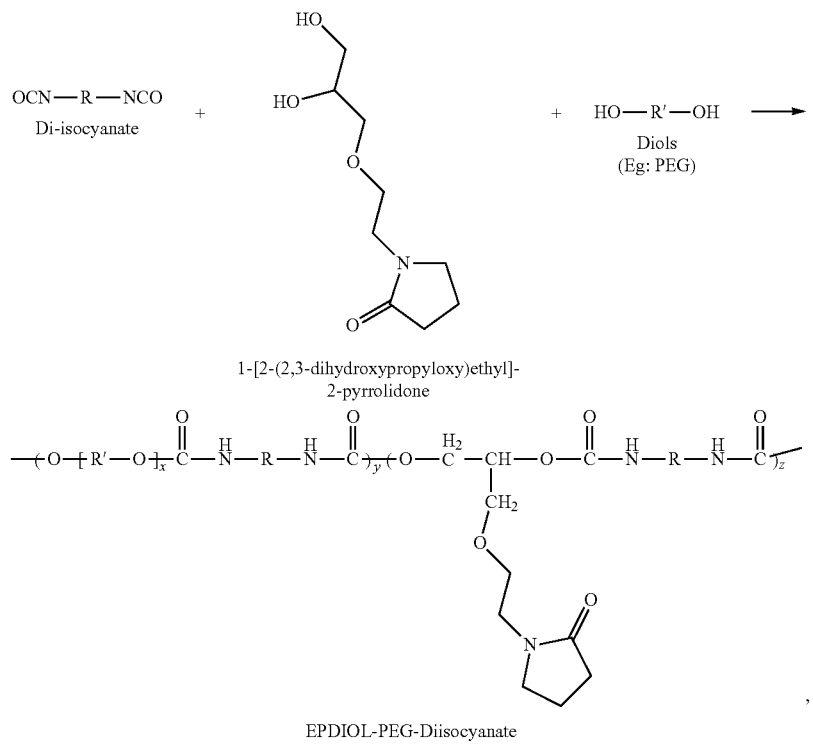
EPDIOL-PEG-Diisocyanate
wherein x+y+z=100.
EPDIOL-DIOL-Diisocyante-Alcohol based polyurethanes:
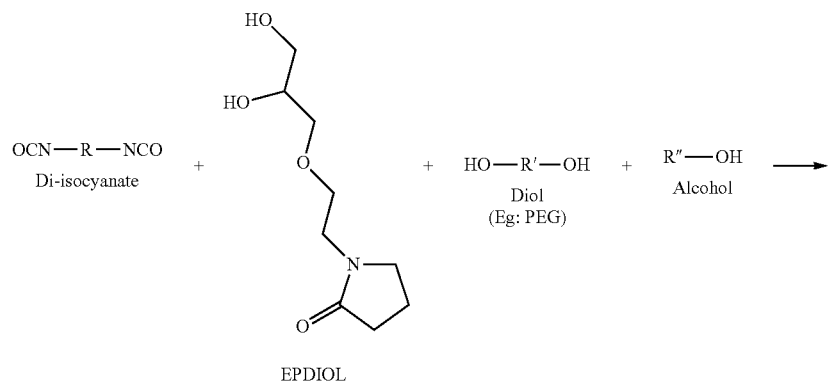

-continued

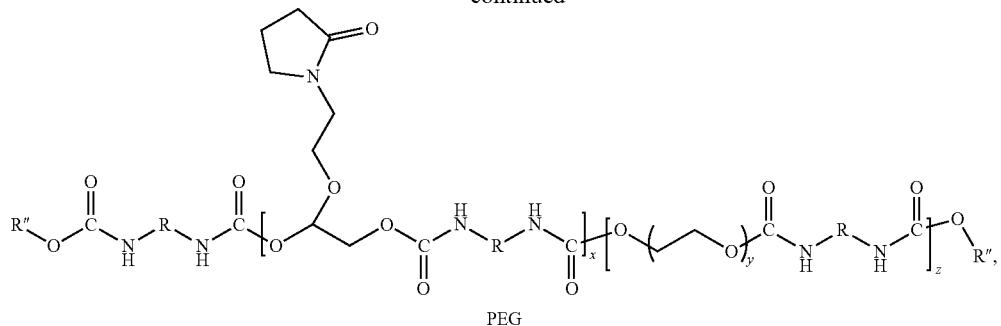

wherein x+y+z=100; and the alcohol can be hexanol.

EPDIOL-DIOL-DMPA-Diisocyanate-Alcohol based polyurethanes:

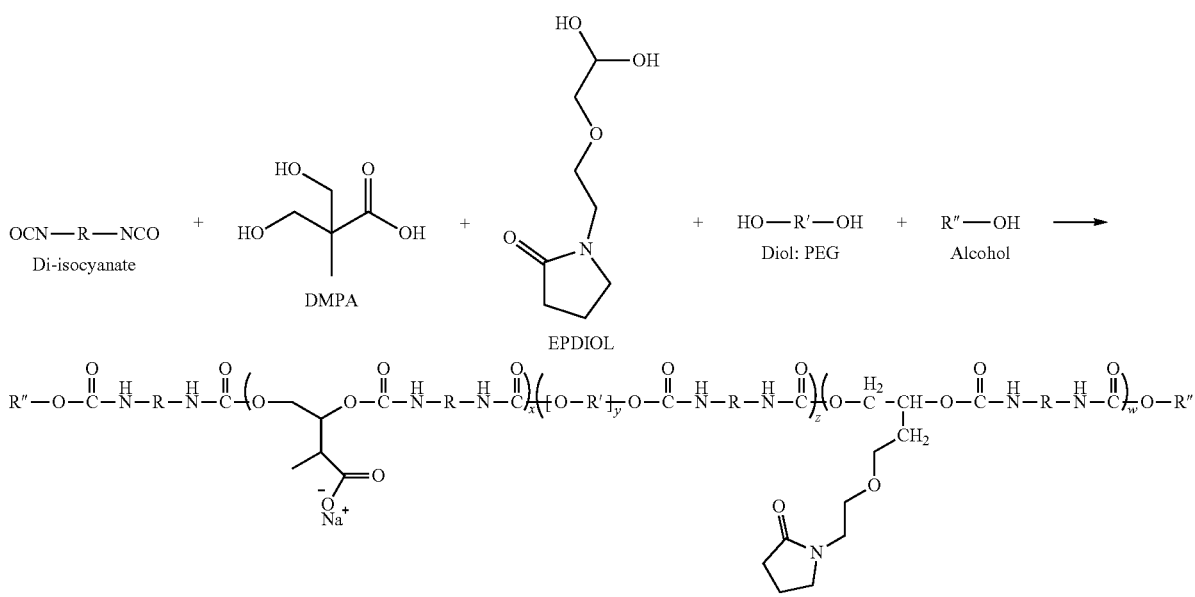

wherein x+y+z+w=100 and the alcohol can be ethanol.

The present disclosure is also directed to a wide variety compositions comprising: (I) a polymer obtained from a reaction mixture comprising: (i) at least one dihydroxy lactam moiety, and (ii) at least one functional moiety having a hydroxyl-reactive functional group; wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane, and (II) one or more additive.

According to one embodiment, the additive is useful in an application selected from the group consisting of adhesives, aerosols, agricultural agents, anti-soil redeposition agents, batteries agents, beverages, biocides, biomaterial, cementing and construction agents, cleaning agents, paints & coating agents, rheology modifiers, conductive materials, cosmetic agents, dental agents, decorated pigments, detergents, dispersants, drugs, electronics, encapsulations, foods, hair care agents, household-industrial institutional agents, inks and coatings, interlaminate, lithographic solutions, membrane additive agents, metal working fluids, oilfield agents, paper sizing agents, polish, personal care agents, pharmaceuticals, pigment additives, plasters, plastic, textile, lubricant, printing, refractive index modifiers, sequestrants, soil release agents, static control agents, and wood-care agents.

The compounds, monomers, and polymers described herein can be used alone or in combination with other ingredient(s) in various compositions and product forms. Such compositions include, but are not limited to, adhesive, aerosol, agricultural compositions, anti-soil redeposition compositions, batteries, beverage compositions, biocide compositions, biomaterial composition, cementing and construction composition, cleaning composition, paints & coating composition, rheology modifier composition, conductive material compositions, cosmetic compositions, dental compositions, decorative pigment compositions, detergent compositions, dispersant compositions, electronic application compositions, encapsulation polymer composition, food composition, hair care composition, household-industrial institutional compositions, inks and coating compositions, interlaminate compositions, lithographic application compositions, membrane composition, metal working fluid composition, oilfield compositions, paper sizing agent compositions, polishing compositions, personal care compositions, pharmaceutical compositions, plaster compositions, plastic additive composition, textile composition, lubricant composition, printing compositions, refractive index modifier compositions, sequestrant compositions, soil release compositions, static control agents, and wood-care compositions.

The term "personal care composition" refers to a composition intended for use on or in the human body. Non-limiting, but specific types of personal care compositions include hair care compositions (encompassing styling and non-styling compositions), sun care compositions (encompassing after-sun compositions), skin care compositions and oral care compositions.

The personal care compositions can be formulated in any of the product forms known to a person of ordinary skill in the art. Non-limiting product forms are described below.

Product Forms:

Non-limiting hair care product forms include: shampoos, conditioners, aerosols, mousses, sprays, mists, gels, waxes, creams, lotions, glues, pomades, spritzes, solutions, oils, liquids, solids, W/O emulsions. O/W emulsions, suspensions, multiple emulsions, microemulsions, microencapsulated products, sticks, balms, tonics, pastes, reconstitutable products, nanoemulsions, solid lipid nanoparticles, liposomes, cubosomes, neosomes, putties, lacquers, serums, perms, volumizers, packs, flakes, 2-in-1 shampoo/conditioner products, and 3-in-1 shampoo/conditioner/styling products.

The compositions according to the invention can also take the form of after-shampoo compositions, to be rinsed off or not, for permanents, straightening, waving, dyeing, or bleaching, or the form of rinse compositions to be applied before or after dyeing, bleaching, permanents, straightening, relaxing, waving or even between the two stages of a permanent or straightening process.

Non-limiting sun care product forms include: solutions, liquids, creams, powders, lotions, gels, pastes, waxes, aerosols, sprays, mists, roll-ons, sticks, milks, emulsions, and wipes.

Non-limiting skin care product forms include: solutions, oils, lotions, creams, ointments, liquids, gels, solids, W/O emulsions, O/W emulsions, milks, suspensions, microemulsions, dispersions, microencapsulated products, sticks, balms, tonics, pastes, mists, reconstitutable products, peels, soaps, aerosols, mousses, waxes, glues, pomades, spritzes, putties, lacquers, serums, perms, powders, pencils, flakes, blush, highlighters, bronzers, concealers, and 2-way cake products.

The compositions of the invention can also take the form of skin-washing compositions, and particularly in the form of solutions or gels for the bath or shower, or of make-up removal products.

Non-limiting six skin care product categories that follow next can be considered a subset of the skin and sun care products:

(1) Eye Care:

Non-limiting eye care product forms include: mascaras, eye liners, eye shadows, curlers of eye lashes, eyebrow pencils, and eye pencils.

(2) Lip Care:

Non-limiting lip care product forms include: lipsticks, lip balms, lip pencils, lip glosses, lip sprays, transparent lip bases, tinted lip moisturizers, and multi-functional color sticks that can also be used for cheeks and eyes.

(3) Nail Care:

Non-limiting nail care product forms include: nail polishes, nail varnishes, enamels, nail varnish removers, home-manicure products such as cuticle softeners and nail strengtheners, and artificial nails.

(4) Face Care:

Non-limiting face care product forms include: creams, lotions, solutions, oils, liquids, peels, scrubs, emulsions, suspensions, microemulsions, microencapsulated product, pastes, reconstitutable product, aerosols, mousses, gels, waxes, glues, pomades, spritzes, facial wet-wipes, putties, lacquers, serums, perms, powders, blush, highlighters, bronzers, masks, and concealers.

(5) Body Care:

Non-limiting body care product forms include: foams, peels, masks, gels, sticks, aerosols, lotions, salts, oils, balls, liquids, powders, peels, pearls, bar soaps, liquid soaps, body washes, cleansers, scrubs, creams, flakes, other bath and shower products, shaving products, waxing products, and sanitizers.

(6) Foot Care:

Non-limiting foot care product forms include: mousses, creams, lotions, powders, liquids, sprays, aerosols, gels, flakes, and scrubs.

Non-limiting oral care product forms include: toothpastes, adhesives, gums, gels, powders, creams, solutions, lotions, liquids, dispersions, suspensions, emulsions, tablets, capsules, rinses, flosses, aerosols, strips, films, pads, bandages, microencapsulated products, syrups, and lozenges.

Also contemplated are personal care compositions comprising polymer(s) described herein complexed with iodine. These compositions can be used in treating skin conditions, non-limiting examples of which include dermatitis, wounds, bacterial infections, burns, rashes, and herpes. These complexed compositions can be staining, substantially non-staining, or essentially non-staining.

Examples of related personal care compositions are disclosed in U.S. Pat. Nos. 5,599,800; 5,650,166; 5,916,549; and 6,812,192; U.S. patent application 2009/0317432; EP 556,660; 661,037; 661,038; 662,315; 676,194; 796,077; 970,682; 976383; 1,415,654; and 2,067,467; and WO 2005/032506; each of which is hereby incorporated in its entirety by reference.

It is also contemplated that the personal care compositions can be used in products for male and/or female personal grooming and/or toiletry such as: sanitary napkins, baby diapers, adult diapers, feminine products, products for incontinence, and other related products.

The present disclosure also relates to a coating composition comprising the dihydroxy lactam based polymers as described hereinabove. The coating composition can further comprise at least one coating agent selected from the group consisting of solvents/cosolvents, secondary rheology modifiers, thixotropic agents, binders, crosslinkers, pH adjustment agents, pigments/fillers, flow-control agents, gloss-control agents, coalescent agents, flexibilizing resins, surfactants, waxes, wetting agents, dispersing agents, plasticizers, anti-oxidants, UV radiation absorbers, biocides, extenders, colorants, adhesion promoters, defoaming agents/defoamers, driers, matting agents, and combinations thereof.

Examples of the pigments/fillers can include, but are not limited to, calcium carbonate, mica, barium sulphate, lithopones, zinc oxide, zinc sulphide, titanium dioxide (anatase, rutile), chalk, precipitated calcium carbonate, calcite, dolomites, silicon dioxide, silicic acids, silica flour, pyrogenic silicic acids, precipitated silicic acids, silicates, talc, kaolin, barium sulfates, magnesium silicates, lead, lead oxides, barytes, blanc fixe, sand and glass beads. Special pigments/fillers can include graphene, graphite, carbon nanotubes, carbon, copper, silver, nanosilver, titanium nanotubes, specially decorated inorganic particles and structures, and the like.

Non-limiting examples of the solvents/cosolvents can include, but are not limited to, aromatic hydrocarbon solvents such as benzene, toluene and xylene, ethyl benzene, isopropyl benzene, alcohols (ethylene glycol monobutyl ether, ethylene glycol monomethyl ether, diethylene glycol mono butyl ether, diethylene glycol monomethyl ether, diethylene glycol monoethyl ether, hexanol, octanol, ethanol, isopropanol, butanol, n-butanol, ethylene glycol, diethylene glycol, ketones (acetone, methyl ethyl ketone, methyl isobutyl ketone, cyclohexanone), diacetone alcohol, dimethyl formamide, n-methyl-2-pyrrolidone, butyrolactone, ethyl acetate, butyl propionate, water, and the like.

Non-limiting examples of the binders can include, but are not limited to latex emulsion polymers, which are the polymerization products of one or more ethylenically unsaturated monomers. Examples of ethylenically unsaturated monomers can include, but are not limited to acrylic acid, acrylonitrile, acetoacetoxy ethyl methacrylate, acetoacetoxy ethyl acrylate, butyl acrylate, butadiene, butyl methacrylate, butyl acrylamide, chloromethyl styrene, crotonic acid, ethyl acrylate, ethyl acrylamide, ethylene, ethyl methacrylate, ethylhexyl acrylate, 2-ethylhexyl acrylate, 2-ethylhexyl methacrylate, glycidyl methacrylate, hydroxyethyl (meth)acrylate, hydroxypropyl (meth)acrylate, isobutyl acrylate, isobutyl methacrylate, isoprene, iso-octyl acrylate, iso-octyl methacrylate itaconic acid, methyl acrylate, octyl acrylate, octyl methacrylate, methyl methacrylate, methacrylic acid, α-methyl styrene, styrene, vinyl chloride vinyl naphthalene, vinyl toluene, vinylidene chloride, vinyl acetate, and the like.

Other binders used in the present disclosure can include, but are not limited to alkyd resins, polyurethane resins, epoxy resins, and the like. Alkyd resins are generally comprised of polybasic acids, polyhydric alcohols, and fatty acids which can be unsaturated. The polybasic acids such as aromatic, aliphatic and alicyclic saturated and unsaturated compounds, such as adipic acid, chlorendic acid, heptanedioic acid, isophthalic acid, maleic acid, naphthalic acid, phthalic acid, sebacic acid, succinic acid, trimellitic acid, terephthalic acid, and tetrahydrophthalic acid. Polyhydric alcohol components include 1,3-butylene glycol, diethylene glycol, dipentaerythritol, dipropylene glycol, ethylene glycol, glycerin, 1,6-hexanediol, neopentyl glycol, pentaerythritol, propylene glycol, sorbitol, trimethylol ethane, trimethylol propane and triethylene glycol. Fatty acids used in the manufacture of alkyds commonly include dehydrated castor oil, coconut oil, cottonseed oil, fish oil, linseed oil, oiticica oil, tung oil, safflower oil, soya oil, tall oil acids, and the like.

The polyurethane resins are formed from polyisocyanate (aliphatic, aromatic, or combinations thereof) compounds. Examples of aliphatic isocyanates include butane diisocyanate, 4,4'-diisocyanatodicyclohexylmethane, hexamethylene diisocyanate, hexahydroxylylene diisocyanate, isophorone diisocyanate, 1-methyl-2,4(2,6)-diisocyanato cyclohexane, norbornane diisocyanate, and tetramethylxylylene diisocyanate. Examples of aliphatic and aromatic isocyanates include 4,4'-biphenylene diisocyanate, 4-chloro-1,3-phenylene diisocyanate, 1,4-cyclohexylene diisocyanate, 1,10-deca-ethylene diisocyanate, methylene bis-(4-phenyl isocyanate), 4,4-methylene-bis(cyclohexyl isocyanate), 1,5-naphthalene diisocyanate, 1,3-phenylene diisocyanate, 2,4-tolylene diisocyanate, 2,6-tolylene diisocyanate, 1,4-tetramethylene diisocyanate, 1,5-tetrahydronaphthalene diisocyanate, and the like.

In addition to isocyanates, alcohols and carboxylic acids, which form polyester compositions, can also be used in the preparation of polyurethane resins. The carboxylic acids can be of an aliphatic, cycloaliphatic, aromatic and/or heterocyclic nature and can comprise halogen atoms and/or unsaturated moieties. Suitable acids include adipic acid, azeleic acid, bis-glycol terephthalate, dimeric fatty acids, dimethyl terephthalate, endomethylenetetrahydrophthalic anhydride, fumaric acid, glutaric anhydride, hexahydrophthalic anhydride, isophthalic acid, maleic acid, maleic anhydride, phthalic anhydride, phthalic acid, suberic acid, succinic acid, sebacic acid, tetrahydrophthalic anhydride and tetrachlorophthalic anhydride. The alcohols examples include 1,4-, 1,3- and 2,3-butylene glycol, cyclohexanedimethanol (1,4-bis-hydroxymethylcyclohexane), diethylene glycol, dipropylene glycol, dibutylene glycol, ethylene glycol, 1,2- and 1,3-propylene glycol, 1,6-hexanediol, 2-methyl-1,3-propanediol, neopentylglycol, 1,8-octanediol, polyethylene glycol, polypropylene glycol, polybutylene glycol, triethylene glycol and tetraethylene glycol. Diols comprising carboxyl or carboxylate groups which are suitable to support ionic or potentially ionic groups are envisioned. Such moieties can be constructed by dihydroxysuccinic acid, dimethylolacetic acid, 2,2-dimethylolpropionic acid, 2,2-dimethylolbutyric acid and 2,2-dimethylolpentanoic acid.

Polyester compositions can be made as part of this inventions as well. Polyesters comprising carboxyl groups and terminal carboxyl groups are envisioned. Also, polyesters constructed from lactones are also envisioned. Polyesters obtained from a reaction mixture comprising at least one dihydroxy lactam moiety and at least one functional moiety having a hydroxyl-reactive functional group, wherein the functional moiety having a hydroxyl-reactive functional group is selected from the group consisting of phthalic anhydride, isophthalic acid, maleic anhydride, chlorine/bromine containing anhydrides and fumaric acid. The polyesters can further comprises one or more non-lactam moiety selected from the group consisting of aliphatic/aromatic alcohols with a carbon chain length of C1-C18, alkoxylated alcohols with a carbon chain length of C1-C18 alcohol, ethylene glycols, alcohol meth(acrylates), polyvinyl alcohols, polycarbonatepolyols, polybutylene glycols, polyethylene glycol, polypropylene glycols, hydroxypolyesters, hydroxypolyethers, hydroxypolythioesters, hydroxypolyacetals, hydroxypolycarbonates, polyetherpolyols, polyesterpolyols, polycarbonatepolyols, hydroxypolyesters, hydroxypolyethers, hydroxypolythioesters, hydroxypolyacetals, hydroxypolycarbonales, aliphatic and aromatic polyether polyols, caprolactone-based polyols, poly(ethylene glycol)-soyamine, poly(ethylene glycol)-castor oil, poly(ethylene glycol)-hydrogenated castor oil, poly(ethylene glycol)-lanolin, poly(ethylene glycol)-lanolin wax, poly(ethylene glycol)-polyvinylidene fluoride, poly(ethylene glycol)-poly(vinyl acetate), poly(ethylene glycol)-polyoxymethylene, poly(ethylene glycol)-ester, an combinations thereof.

Polycarbonates comprising hydroxyl groups are useful and are prepared by reacting diols with dicarbonates such as diphenyl carbonate or phosgene.

Polyethers comprising diols, formed from polymers derived from ethylene oxide, propylene oxide and/or tetrahydrofuran are also useful. An amine functionality can be employed to introduce terminal hydroxyl functionality, with compounds such as diethanolamine, ethanolamine, N-methylethanolamine, propanolamine, N,N,N'-tris-2-hydroxyethyl-ethylendiamine.

The epoxy resins are comprised primarily of linear chain molecules. These molecules are formed from the reaction of bisphenols with halohydrins to yield epoxy resins containing epoxy groups. Common bisphenols include bisphenol-A, bisphenol-F, bisphenol-S, and 4,4' dihydroxy bisphenol. Common halohydrins include epichlorohydrin, dichlorohydrin, and 1,2-dichloro-3-hydroxypropane. Examples of commercially available epoxy resins include D.E.R.™ 333 and D.E.R.™ 661 from The Dow Chemical Company; EPON™ 828, EPON™ 836, and EPON™ 1001 from Momentive Specialty Chemicals Inc.; Ciba-Geigy epoxy resins GT-7013, GT-7014, GT-7074, GT-259 from Huntsman; and Ancarez® AR 555 from Air Products.

Non-limiting examples of the secondary rheology modifiers can include celluloses and cellulose derivatives, guar and guar derivatives, modified ureas, polyurethane thickeners and associative thickeners, alkali swellable emulsions (ASEs), hydrophobically modified alkali swellable emulsions (HASEs), hydrophobically modified polyurethanes (HEURs), hydrophobically modified polyethers (HMPEs), attapulgites, hydrophobically modified polyacetal polyethers (HMPAPEs), acrylate thickeners, amides and organic derivatives, fumed silicas, synthetic layered silicates, organoclays, mixed minerals, thixotropy boosters, polyalkylene ether derivatives, starches, polyacrylates, and the like.

Non-limiting examples of the pH adjustment agents can include, but not limited to monoethanol amine, triethanol amine, methylaminoethanol, 2-amino-2-methyl-1-propanol, 2-(n-butylamino) ethanol, ammonium hydroxide, ammonia, caustic, potassium hydroxide, formic acid, acetic acid, citric acid, organic acids, minerals acids, hydrochloric acid, sulfuric acid, nitric acid, phosphoric acid, and the like.

Non-limiting examples of biocidal agents can include, but not limited to 2-n-octyl-3-isothiazolone, chlorothalonil, carbendazim, diuron, isothiazolone, 2-octyl-2H-isothiazol-3-one (OIT), iodopropynyl butyl carbamate (IPBC), sodium 2-pyridinethiol-1-oxide, zinc 2-pyridinethiol-1-oxide, 1,2-dibromo-2,4-dicyanobutane, 2-(4-thiazolyl)-benzimidazole, thiabendazole, tebuconazole, methylene bis(thiocyanate), 2-(thiocyano-methylthio)-benzothiazole, octhilinone, barium metaborate, propiconazole, diiodomethyl p-tolyl sulfone, 3-iodo-2-propynyl butyl carbamate, n-(trichloromethylthio) phthalimide, tributyltin benzoate, alkyl amine hydrochlorides, n-trichloromethylthio-4-cyclohexene-1,2-dicarboximide, 2-methylthio-4-tert-butyl-amino-6-cyclopropylamino-s-triazine, tetrachloroisophthalonitrile, zinc dimethyldithiocarbamate, zinc 2-mercaptobenzothiazole, trans-1,2-bis(n-propyl-sulfonyl ethane, 4,5-dichloro-2-n-octyl-3-(2H)-isothiazolone, 4,5-dichloro-2-octyl-4-isothiazolin-3-one (DCOIT), carbendazim, Irgarol, 10,10'-oxybisphenoxarsine, triclosan, 2-methylthio-4-tert-butyl-amino-6-cyclopropylamino-s-triazine, n-cyclopropyl-N'-(1,1-dimethylethyl)-6-)methylthio)-1,3,5-triazine-2,4-diamine, zinc dimethyldithiocarbamate (Ziram), Irgarol® 1051 (commercially available from BASF SE), tributyltin oxide (TBTO), 5-chloro-methyl-2H-isothiazol-3-one/2-methyl-2H-isothiazol-3-one (CIT/MIT), benzisothiazolinone (BIT), methylisothiazolinone (MIT), hexahydro-1,3,5-tris(2-hydroxyethyl)-S-triazine, sodium pyrithione, zinc 2-pyridinethiol-1-oxide, 1,2-benzoisothiazolin-3-one, glutaraldehyde, 2,2-dibromo-3-nitrilopropionamide (DBNPA), poly (hexamethylenebiguanide) hydrochloride (PHMB), 2-bromo-2-nitropropane-1,3-diol (Bronopol), 1,2-dibromo-2-4-dicyanobutane, 1-bromo-1-(bromomethyl)-1,3-propanedicarbonitrile, 2,2-dibromo-3-nitrio-propionamide, benzyl bromoacetate, 1-bromo-1-(bromomethyl)-1,3-propanedicarbonitrile, Dazomet, dodecylguanidine hydrochloride, methylene dithiocyanate, l-methyl-3,5,7-triaza-1-azoniaadamantane chloride, 2-bromo-4'-hydroxyacetophenone, dibromo-3-nitrilopropionamide, 1,2-benzisothiazolin-3-one, hexahydrotriazine, bromo-beta-nitrostyrene, ethyldihydro-1H,3H,5H-oxazolo(3,4-C)oxazole, acetoxy-2,4-dimethyl-m-dioxane, nitrobutyl morpholine, ethyl-2-nitrotrimethylene dimorpholine, sodium o-phenylphenate, chloroallyl-3,5,7-azoniaadamantane chloride, sodium salt of biphenylol, tributyltin benzoate, alkylamine hydrochlorides, mixture of monocyclic oxazolidines, n-methyl-2-hydroxymethylene-oxypropyl-2'-hydroxypropylamine, sodium hydroxymethyl glycinate, mixture of bicyclic oxazolidines, 1,3-bis(hydroxymethyl)-5,5-dimethyl hydantoin, hydroxymethyl 5,5-dimethylhydantoin, 5-chloro-2-methyl-4-isothiazolin-3-one, 2-methyl-4-isothiazolin-3-one, 2-methyl-4-isothiazolin-3-one, and combinations thereof.

Non-limiting examples of colorants can include pigments and/or dyes. Suitable pigment materials can be found in Hunger's "Industrial Organic Pigments," Itoh's "Dictionary of Pigments," and Leach and Pierce's "Printing Ink Manual." Examples of inorganic pigments can include, but are not limited to, pigment blacks (lamp, furnace, channel blacks), iron oxides (red, yellow, brown, black, transparent, etc.), spinel black, chromium oxides green, chromate yellows, iron blues, zinc chromate, molybdate orange, molybdate reds, ultramarine, cadmium, mixed phase pigments (nickel titanium yellow, chromium titanium yellow, cobalt green, cobalt blue, zinc iron brown, iron manganese black), all types of metallic powder pigments such as aluminum powder, gold powder, silver powder, copper powder, bronze powder, and brass powder; or their metal flake pigments; mica flake pigment; mica flake pigments which have been coated with metallic oxides; mica shape oxide pigments, and the like.

Organic pigments can include, but are not limited to, monoazo pigments (acetoacetarylide, benzimidazolone, naphthol AS, pigmented b-naphthol dyes), disazo pigments (azo condensation pigments, dipyrazolone), polycyclic pigments (quinacridone, dioxazine, perylene, diketopyrrolopyrrole, isoindoline), and metal complex pigments (Cu-phthalocyanines). Examples of the dyes can include metal complex dyes, anionic dyes, azo dyes, and the like.

The cellulose derivatives can include, but are not limited to, ethyl cellulose (EC), hydroxyethyl cellulose (HEC), hydroxypropyl cellulose (HPC), ethylhydroxyethyl cellulose (EHEC), carboxymethyl cellulose (CMC), carboxymethylhydroxyethyl cellulose (CMHEC), hydroxypropylhydroxyethyl cellulose (HMHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxylpropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmothyl cellulose (HMCMMC), cationic hydroxyethyl cellulose (cationic HEC), cationic hydrophobically modified hydroxyethyl cellulose (cationic HMHEC), nano fibrillated cellulosics (NFC), and microfibrillated cellulosics (MFC).

The guar and guar derivatives can include, but are not limited to, carboxymethyl guar, carboxymethylhydroxypropyl guar, cationic hydroxypropyl guar, hydroxyalkyl guar such as hydroxyethyl guar, hydroxypropyl guar, and hydroxybutyl guar, carboxylalkyl guars such as carboxymethyl guar, carboxylpropyl guar, carboxybutyl guar, and the like.

Examples of the defoaming agents or defoamers can include, but are not limited to, silicone defoamers, silicone defoamers comprising polysiloxane and hydrophobic particles, silicone-free defoamers comprising hydrophobic particles and polymers, silicone-free defoamers comprising polymers, mineral oil defoamers comprised of paraffin based mineral oil, hydrophobic particles, and polysiloxanes.

Surfactants can provide excellent surface tension reducing capabilities for substrate wetting. Surfactants used in the present disclosure can be nonionic and anionic surfactants.

Examples of the nonionic surfactants can include, but are not limited to, C12-C18 fatty alcohol ethoxylates, C12-C14 fatty alcohol ethoxylates, C16-C18 fatty alcohol ethoxylates, C13-C15 oxo alcohol ethoxylates, C10-C18 alcohol ethoxylates, C13 oxo alcohol ethoxylates, C10 Guerbet alcohol ethoxylates, C10 Guerbet alcohol alkoxylates, C10 oxo alcohol ethoxylates, alkyl polyglucosides (e.g., C8-C10 alkyl polyglucoside, C8-C14 alkyl polyglucoside, C12-C14 alkyl polyglucoside, blends of C12-C10 alkyl polyglucoside on inorganic and organic carrier, amine ethoxylates (e.g., oleyl amine+12 EO, coco amine+12 EO), aminopolyol (e.g., triethanol amine+18 EO, ethylene diamine+4 PO), alkyl pyrrolidones (e.g., N-octyl pyrrolidone, N-butyl pyrrolidone, N-dodecyl pyrrolidone), resin precursors and additives (e.g., Bisphenol A ethoxylates, BIS A+3 EO, BIS A+4 EO, BIS A+6 EO), emulsifiers and solubilizers (e.g., 4-C10-13-sec-alkyl derivatives of benzenesulfonic acid calcium salts, castor oil+~20 EO, castor oil+~35 EO, castor oil+~40 EO, epoxidized vegetable oil, ethoxylated rape seed oil, sorbitanester ethoxylated, decyl alcohol+~3 EO, C8 fatty alcohol+4 EO, fatty alcohol ethoxylate, C8-C10 fatty alcohol+~5 EO, C12-C14 fatty alcohol+~50 EO, ethoxylated sorbitan trioleate, castor oil ethoxylate, phenol ethoxylate, alcohol ethoxylate, ethoxylated mono-/di glyceride), foam suppressors (e.g., polyalkoxyester and solvent, fatty alcohol alkoxylate, carboxylic acid ester, phosphoric acid ester, combination of paraffin and silicon on carrier, alkyl polyalkylene glycol ether, Guerbet alcohol C16+~2 EO, fatty alcohol alkoxylate), low-foaming nonionic surfactants (e.g., fatty alcohol alkoxylate, modified fatty alcohol polyglycol ether, amine alkoxylate, end-capped Guerbet alcohol alkoxylate, end-capped fatty alcohol alkoxylate, PO/EO block copolymers), lauramine oxide, cocamidopropylamine oxide, alkylamido propyl betaine, polyglycol ether of an aliphatic diol, oleic acid amide+10 EO, emulsifiable methyl canolate, unsaturated fatty alcohol ethoxylate, fatty alcohol poly glycol ethers, fatty alcohol poly glycol ethers with fatty acid, unsaturated fatty alcohol ethoxylate), polyethylene glycols, polypropylene glycols, methyl polyethylene glycols, alkyl polyalkylene glycol copolymers, alkyl polypropylene glycols, polyfunctional polyalkylene glycols, reactive polyalkylene glycols.

Other nonionic surfactants can include, but are not limited to, alkylphenol ethoxylates such as nonylphenol ethoxylates and octylphenol ethoxylates, secondary alcohol alkoxylates such as secondary alcohol ethoxylates (TERGITOL™15-S-9, commercially available from The Dow Chemical Company), and primary alcohol alkoxylates.

Examples of anionic surfactants can include, but are not limited to, sodium salt of lauryl ether sulfate+2 EO, sodium salt of iso-tridecyl alcohol ether sulfate+20 EO, sodium salt of fatty alcohol ether sulfate+2 EO, sodium salt of fatty alcohol ether sulfate+4 EO, sodium salt of fatty alcohol ether sulfate+7 EO, sodium salt of fatty alcohol ether sulfate+12 EO, sodium salt of fatty alcohol ether sulfate+30 EO, sodium salt of fatty alcohol ether sulfate+50 EO, sodium salt of C12-C14 fatty alcohol ether sulfate+1 EO, sodium salt of C12-C14 fatty alcohol ether sulfate+2 EO, sodium salt of C12-C14 fatty alcohol ether sulfate+3 EO, ammonium salt of C8-C14 fatty alcohol sulfate, sodium salt of 2-ethylhexyl sulfate, sodium salt of C16-C18 fatty alcohol sulfate, sodium salt of C12 fatty alcohol sulfate, sodium salt of C12-C14 fatty alcohol sulfate, sodium salt of C12-C16 fatty alcohol sulfate, sodium salt of C12-C18 fatty alcohol sulfate, sodium salt of C16-C18 fatty alcohol sulfate, sodium salt of C8 fatty alcohol sulfate, sodium salt of linear C10-C13 alkyl benzene sulfonate, sodium salt of linear C10-C13 alkyl benzene sulfonic acid and potassium salt of oleic acid sulfonate.

Other surfactants used in the present disclosure can include, but are not limited to ester quats, sodium salt of alkyl ether phosphate, sodium-N-lauryl-β-iminodipropionate, acid phosphoric ester of a fatty alcohol ethoxylate+3 EO, sodium salt of mono-alkenyl sulfosuccinamate, sodium salt of mono-alkenyl sulfosuccinate+5 EO, sodium salt of di-isodecyl sulfosuccinate, sodium dioctylsulphosuccinate, acid phosphoric ester, amine salt of dodecylbenzenesulphonate, alkyl ester phosphate, and the like.

Non-limiting examples of coalescent agents can include ethylene glycol monobutyl ether acetates, diethylene glycol monoethyl ether, lower monoalkyl ethers of ethylene or propylene glycol (propylene glycol methyl ether), dimethyl succinate, diethyl succinate, diisopropyl succinate, toluates (e.g., 2-ethoxyethyl p-toluate, 2-propoxyethyl o-toluate, 2-ethoxyethyl o-toluate, 2-ethoxyethyl benzoate, 2-(2-ethoxyethoxy)ethyl p-toluate), benzoates (e.g., 2-(2-ethoxyethoxy)ethyl benzoate, 2-propoxyethyl benzoate, 2-methoxy-1-methylethyl benzoate, 2-(2-methoxy-1-methylethoxy)-1-methylethyl benzoate, 2-propoxy-1-methylethyl benzoate). Levulinic acid ester of 2-hexyl-1-decanol, levulinic acid ester of 1-tetradecanol/2-hexyldecanol, di-octyl succinate, polytrimethylene ether glycol, hexylene glycol, butoxyethyoxypropanol, n-propoxypropanol, n-butoxypropanol, diethylene glycol monobutyl ether acetate, phenyl glycol ether, 2,2,4-trimethylpentanediol-1,3-monoisobutyrate, n-dibutyl glutarate, n-dipentyl glutarate, n-dihexyl glutarate, n-diheptyl glutarate, n-dioctyl glutarate, di-isobutyl glutarate, di-2-methylbutyl glutarate, di-4-methyl-2-pentyl glutarate, di-2-ethylhexyl glutarate, pentylol glutarate, tetrapropylene glycol monobutyl ether, and the like. Mixtures of these compounds are also suitable as coalescing agents.

Coating compositions comprising the dihydroxy lactam based polymers according to the present disclosure can be applied to a variety of surfaces and substrates. These surfaces and substrates can include, but are not limited to, asphalt, cement, concrete, drywall, glass, masonry, metal, paper, plastic, textile, wall paper, and wood. The coating compositions according to the present disclosure can provide an enhanced hiding power to substrates coated with the compositions.

The present disclosure is further directed to a pharmaceutical composition comprising: (I) a polymer obtained from a reaction mixture comprising (i) N-(2,3-dihydroxypropyl)-2-pyrrolidone and/or 1-[2-(2,3-dihydroxypropyloxy)ethyl]-2-pyrrolidone; and (ii) poly(D,L-lactide), wherein (i) and (ii) independently present in amount of about 0.01 mole % to about 99.99 moles % and the polymer is a polyester, and (II) one or more pharmaceutically acceptable additive.

According to one of the embodiments, the pharmaceutically acceptable additive is selected from a group consisting of plasticizers, disintegrants, surfactants, lubricants, glidants, carriers, anti-adherents, fillers, wetting agents, pH modifiers, binders, solubility modifiers, recrystallization inhibitors, coating agents, diluents, coloring agents, preservatives, antifoaming agent, antioxidants, buffering agents, acidifying agents, alkalizing agents, complexation-enhancing agent, cryoprotectant, electrolytes, gelling agents, emulsifying agents, solubility-enhancing agents, stabilizers, tonicity modifiers, flavors, sweeteners, complexing agents, fragrances, and viscosity modifiers.

The present disclosure is also directed to a process of preparing a polymer comprising: (A) (i) at least one dihydroxy lactam moiety, and (ii) at least one functional moiety having a hydroxyl-reactive functional group; wherein (i) and (ii) are independently present in amounts of about 0.01 mole % to about 99.99 moles % and the polymer is selected from the group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and the polymer is a polyurethane; (B) charging (A) into a reaction container under inert gas atmosphere with solvent; (C) stirring the reaction mixture of (B) and maintaining temperature at 55-70° C. for about 30 minutes; (D) charging an additional reactive moiety to (C); (E) polymerizing (D) with catalyst for 3-5 hours; and (F) retrieving desired polymer from (E).

A solvent can be used for the synthesis of the polymers according to the present disclosure. Any solvent without active hydrogens can be used. Non-limiting examples of solvents can include acetone, dimethyl acetamide, toluene, xylene, aliphatic hydrocarbons, dialkyl ethers of alkylene glycols and diethoxymethane.

According to another embodiment, the solvent system is present in an amount from about 60% to about 99.9% by weight of the thickener system. In another embodiment, other possible ranges of solvent system would include, but are not limited to, from about 60 wt. % to about 70 wt. %; from about 70 wt. % to about 80 wt. %; from about 80 wt. % to about 90 wt. %; from about 90 wt. % to about 99.9 wt. %.

A catalyst can be used for the synthesis of the polymers according to the present disclosure. Non-limiting examples of catalysts can include dibutyltin dilaurate, 1,4-diazabicyclo[2, 2,2]octane, triethyl amine, pyridine, and paratoulenesulfonic acid.

The present disclosure relates to a method of thickening a composition comprising adding the dihydroxy lactam based polymer described hereinabove into the composition. Examples of the compositions can include, but are not limited to, coating compositions, construction compositions, personal care compositions, oilfield compositions, drilling fluids, drilling muds, cementing fluids, servicing fluids, gravel packing muds, fracturing fluids, completion fluids, workover fluids, spacer fluids, household, industrial and institutional compositions, pharmaceutical compositions, food compositions, biocides, adhesives, inks, papers, polishes, membranes, metal working fluids, plastics, textiles, printing compositions, lubricants, preservatives, agrochemicals, and wood-care compositions.

The polymers and their applications according to the present disclosure can be prepared and used according to the examples set out below. These examples are presented herein for purposes of illustration of the present disclosure and are not intended to be limiting, for example, the preparations of the polymers and their applications.

EXAMPLES

In the examples, the following abbreviations are used:
EPDIOL: 1-[2-(2,3-dihydroxypropyloxy)ethyl]-2-pyrrolidone
PEG1: Polyethylene glycol with approximate $M_n$=7860, and $M_w$=8240
PEG2: Polyethylene glycol with approximate $M_n$=3640, and $M_w$=3790
DBTD: Dibutyltin dilaurate
HMDI: 4,4'-Methylenebis(cyclohexyl isocyanate)
HDI: Hexamethylenediisocyanate
IPDI: Isophorone Diisocyanate
DMBA: Dimethylol butyric acid
DMAc: Dimethyl acetamide
MBPI: 4,4'-Methylenebis(phenyl isocyanate)
DMPA: Dimethylol propoionic acid
MDEA: Methyl diethanol amine
TEA: Triethyl amine
DMI: Dimethylitaconate
MA: Maleic anhydride
Acr.Cl: Acryloyl chloride
GMA: Glycidyl Methacrylate Example 1: Reaction of EPDIOL with Glycidol A mixture of Glycidol (5.45 g) and EPDIOL (15 g) was mixed in mixture of acetone and TEA (40 g) in a round bottom flask equipped with a stir bar and a heating mantle, the mixture was stirred at 55° C. for 6 hours. The resulting mixture was clear and the resulting product was verified by IR through the disappearance of the epoxide absorbance bands in the 800 region and the formation of the ether absorbance band (1,100-1,200 $cm^{-1}$).

Example 2: Reaction of EPDIOL with Succinyl Chloride

A mixture of Succinyl Chloride (11.44 g) and EPDIOL (15 g) was mixed in acetone (50 g) in a round bottom flask equipped with a stir bar and a heating mantle, the mixture was stirred for 2 hours at 55° C. The resulting mixture was dark brown in color and the resulting product was verified by IR through the formation of the 1735 $cm^{-1}$ ester absorbance band.

Example 3: Reaction of EPDIOL with DMI

A mixture of DMI (11.65 g) and EPDIOL (15 g) was mixed in a mixture of acetone and TEA (50 g) in a round bottom flask equipped with a stir bar and a heating mantle, the mixture was stirred for 4 hours at 55° C. The resulting mixture was clear and the resulting product was verified by IR through the reduction of the methoxy $CH_3$ band at 2840 $cm^{-1}$ and the formation of the ester absorbance band at 1730.

Example 4: Reaction of EPDIOL with MA

A mixture of MA (15 g) and EPDIOL (31.10 g) was mixed in acetone (65 g) in a round bottom flask equipped with a stir bar and a heating mantle, the mixture was stirred at 55° C. for 6 hours. The resulting mixture was yellowish in color and the resulting product was verified by through the disappearance of the anhydride 1850 cm$^{-1}$, 1774 cm$^{-1}$ peaks and the appearance of the 1717 cm$^{-1}$ ester peak.

Example 5: Reaction of EPDIOL and Acr.Cl

A mixture of Acr.Cl (6.68 g) and EPDIOL (43 g) was mixed in acetone (43 g) in a round bottom flask equipped with a stir bar and a heating mantle. The mixture was further added with triethyl amine as a catalyst and the mixture was stirred for 2 hours at 55° C. The resulting mixture was orange in color and the resulting product could be verified by IR through the ester peak of 1730 cm$^{-1}$.

Example 6: Reaction of EPDIOL and GMA

A mixture of GMA (10.49 g) and EPDIOL (15 g) was mixed in acetone (50 g) in a round bottom flask equipped with a stir bar and a heating mantle. The mixture was further added with triethyl amine as a catalyst and the mixture was stirred at 55° C. for 2 hours. The resulting mixture was clear in color and the resulting product could be verified by IR through the disappearance of the epoxide 844 absorbance band and formation of the ether absorbance band at 1,100 cm$^{-1}$.

Example 7: Reaction of EPDIOL and Phosphorus Oxychloride

A mixture of Phosphorus oxychloride (11.30 g) and EPDIOL (15 g) was mixed in acetone (50 g) in a round bottom flask equipped with a stir bar and a heating mantle. The mixture was further added with triethyl amine as a catalyst and the mixture was stirred for 4 hours. The resulting mixture was dark brown in color.

EPDIOL based Polyurethanes

Example 8: Reaction of EPDIOL with MBPI

EPDIOL (0.5 moles) and DMAc were charged to a process reactor. The reaction mixture was stirred and heated to a temperature of 65-70° C. Further, MBPI (1.1 moles) was charged to the reaction mixture and the reaction mixture was stirred for 5-15 minutes. DBTD (2.0% by weight of isocyanates) was added to the reaction mixture and stirred for 5 hours. The contents were discharged and allowed to cool to ambient temperature to give polymer.

Example 9: Reaction of EPDIOL with PEG2, DMBA, HDI and Hexanol

EPDIOL (0.73 moles), PEG2 (0.32 moles) and DMBA (0.95 moles) and Acetone were charged to a process reactor. The reaction mixture was stirred and heated to a temperature of 70-75° C.° C. Further, HDI (2.1 moles) was charged to the reaction mixture and the reaction mixture was stirred for 5-15 minutes. DBTD (2.0% by weight of isocyanates) was added to the reaction mixture and stirred for 4 hours. Hexanol (0.2 moles) was added and stirred for 1.0 hours. Triethyl amine was added to neutralize DMBA and the contents were discharged and allowed to cool to ambient temperature to give polymer.

Example 10: Reaction of EPDIOL with MDEA, PEG2, HDI, and Hexanol

EPDIOL (0.73 moles), PEG2 (0.32 moles) and methyl diethanol amine (0.95 moles) and Acetone were charged to a reactor. The reaction mixture was stirred and heated to a temperature of 70-75° C. Further, HDI (2.1 moles) was charged to the reaction mixture and the reaction mixture was stirred for 5 minutes. DBTD (2.0% by weight of isocyanates) was added to the reaction mixture and stirred for 5 hours. Hexanol (0.2 moles) was added and stirred for 1.0 hours. Acetic acid was added, the contents were discharged and allowed to cool to ambient temperature to give polymer.

Example 11: The Reaction of Example 9 was Repeated by Replacing DMBA with DMPA and by Replacing HDI with IPDI Hydrophobically Modified Urethane-Ethoxylates (HEUR) Polymers Hydrophobically modified urethane-ethoxylates (HEUR) polymers are prepared by incorporation of EPDIOL monomer onto the backbone of a urethane ethoxylate polymer "Structure-1".

Structure-1

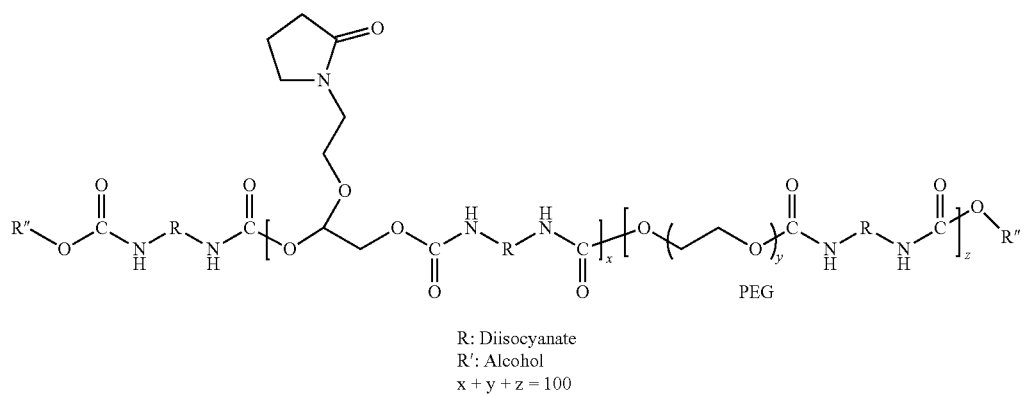

R: Diisocyanate
R': Alcohol
x + y + z = 100

Example 12(a): EPDIOL-IPDI-HEUR

Hydrophobically modified urethane-ethoxylates (HEUR) polymers were prepared by reaction mixture comprising EPDIOL monomer and IPDI are depicted in Structure-2 and described in below examples.

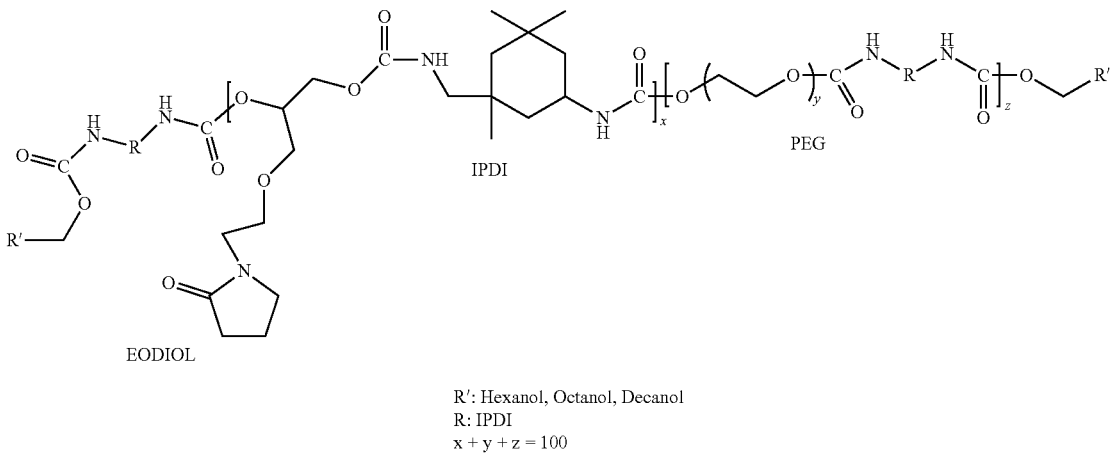

Structure-2

R': Hexanol, Octanol, Decanol
R: IPDI
x + y + z = 100

TABLE 1

EPDIOL-PEGI-IPDI-Hexanol-HEUR

| Example | nEPDIOL | Mn | Mw | B.V@20% |
|---|---|---|---|---|
| Example 12 (a) (i) | 0 | 23,700 | 44,300 | 310 |
| Example 12 (a) (ii) | 1 | 19,700 | 39,000 | 336 |
| Example 12 (a) (iii) | 3 | 22000 | 40300 | 510 |
| Example 12 (a) (iv) | 6 | 20700 | 39000 | 1420 |

TABLE 2

EPDIOL-PEG2-IPDI-Hexanol-HEUR

| Example | nEPDIOL | Mn | Mw | B.V@20% |
|---|---|---|---|---|
| Example 12 (a) (v) | 0 | 13,600 | 23,700 | 154 |
| Example 12 (a) (vi) | 1 | 11,200 | 18,400 | 339 |
| Example 12 (a) (viii) | 3 | 10,508 | 17,944 | 1,444 |
| Example 12 (a) (ix) | 6 | 9,600 | 14,500 | 3,920 |

TABLE 3

EPDIOL-PEGI-IPDI-Hexanol-HEUR

| Example | nEPDIOL | Mn | Mw | B.V@20% |
|---|---|---|---|---|
| Example 12 (a) (x) (C8) | 6 | 18412 | 35215 | 2080 |
| Example 12 (a) (xi) (C10) | 6 | 19437 | 36834 | 8600 | nEPDIOL means Target number of EPDIOL per chain.

Example 13: Solvent Process

EPDIOL (12.71 g) was dissolved in 15 g anhydrous acetone and charged to a process reactor along with 182.53 g of PEG2 and 175.0 g of anhydrous acetone. The reaction mixture is mixed and heated to 65-70° C. Further, IPDI (27.46 g) in 15 g anhydrous acetone was charged at the temperature, was mixed for 5-15 minutes. Then charged 0.590 g of DBTDL (Dibutyltin dilaurate) in 10 g acetone. Mixed for 5 hours. Further, charged 2.53 g hexanol and continued the reaction for 1.0 hour. At the end, the product was discharged, the product was either dried in a vacuum oven or subjected to solvent exchange into water.

Example 14: EPDIOL-HMDI HEUR Polymers

TABLE 4

EPDIOL-PEGI-HMDI-Hexanol-HEUR

| Example | Target number of EPDIOL per chain (nEPDIOL) | Mn | Mw | B.V@20% |
|---|---|---|---|---|
| Example 14(a) | 0 | 23,300 | 37,500 | 6,120 |
| Example 14 (b) | 0 | 21,800 | 40,300 | 4,280 |
| Example 14 (c) | 1 | 22,800 | 38,900 | 13,440 |
| Example 14 (d) | 1 | 23,030 | 37,026 | 11,640 |
| Example 14 (e) | 2 | 17,887 | 31,740 | 37,200 |
| Example 14 (f) | 3 | 21,500 | 36,000 | 130,000 |
| Example 14(g) | 6 | 19,100 | 34,900 | N/A |

Example 14(c): Melt Process polyethylene glycol (PEG1) (1,376.50 g), EPDIOL (18.88 g), were charged to a process reactor. The reaction mixture was heated to 100-110° C. and stirred under vacuum for 0.5-1.0 hours. The reaction mixture was cooled to 75-80° C. and further charged HMDI (89.30 g) and mixed for 5-15 minutes. Afterwards, dibutyltin dilaurate (1.92 g) was charged and mixed for 2.0-2.5-hours at 100-110° C. Once mixing completed, hexanol (16.83 g) was charged and continued the reaction for 1.0 hours. After the reaction completed, the contents were discharged and allowed to cool to ambient temperature to give polymer.

Example 14(d): Solvent Process

EPDIOL (1.89 g) was dissolved in anhydrous acetone (15 g) and charged to a process reactor along with polyethylene glycol1 (PEG1) (137.65 g) and acetone (245 g). Stirred and heated the mixture to 65-70° C. At temperature, a mixture of (8.93 g) HMDI in (15 g) acetone was charged and mixed for 5-15 minutes. Then (0.20 g) dibutyltin dilaurate was charged in (10 g) acetone and mixed for 5 hours, then hexanol (1.68 g) charged in (15 g) acetone and continued the reaction for 1.0 hours. The product was discharged, and either dried in a vacuum oven or solvent exchange into water.

Example 15: EPDIOL-HDI-HEUR Polymers

EPDIOL-HDI-HEUR polymers of Structure-3 were prepared by following compositions of EODIOL.

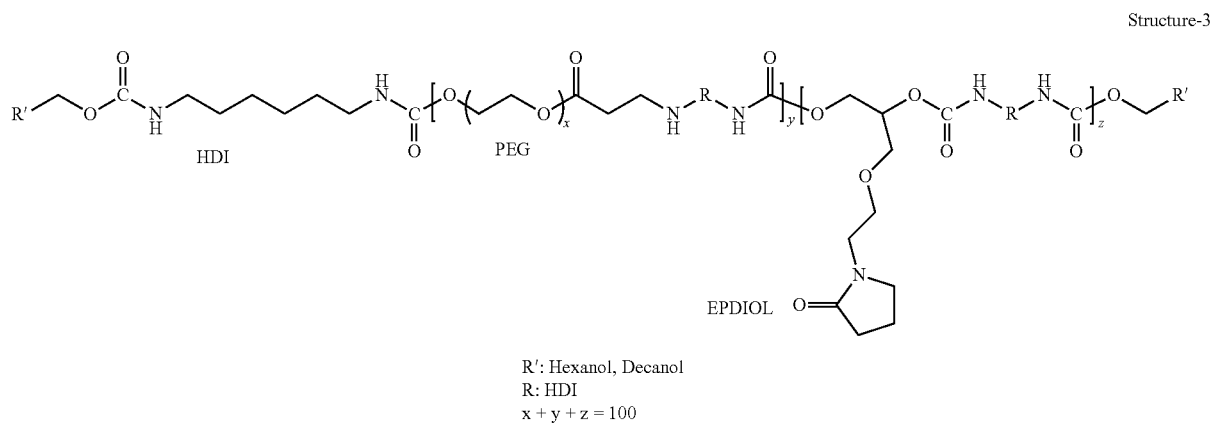

Structure-3

R′: Hexanol, Decanol
R: HDI
x + y + z = 100

TABLE 5

EPDIOL-PEGI-HDI-Hexanol-HEUR

| Example | Target nEPDIOL | Mn | Mw | B.V@20% |
|---|---|---|---|---|
| Example 15 (a) | 0 | 22100 | 41000 | 291 |
| Example 15 (b) | 1 | 19060 | 37482 | 233 |
| Example 15 (c) | 3 | 21000 | 39000 | 226 |
| Example 15 (d) | 6 | 20000 | 37000 | 212 |

TABLE 6

EPDIOL-PEG2-HDI-Hexanol-HEUR

| Example | Target nEPDIOL | Mn | Mw | B.V@20% |
|---|---|---|---|---|
| Example 15 (e) | 0 | 14589 | 24992 | 101 |
| Example 15 (f) | 1 | 13611 | 22746 | 100 |
| Example 15 (g) | 3 | 10400 | 16100 | 90 |
| Example 15 (h) | 6 | 10300 | 15800 | 126 |

TABLE 7

EPDIOL-PEGI-HDI-Decanol-HEUR

| Example | Target nEPDIOL | Mn | Mw | B.V@20% |
|---|---|---|---|---|
| Example 15 (i) (C10) | 5 | 20356 | 38200 | 2,212 |
| Example 15 (j) (C10) | 3 | 20843 | 37930 | 2,756 |

TABLE 8

EPDIOL-PEG1-HDI-Decanol- HEUR

| Example | PEG | Target nEPDIOL | Mn | Mw | B.V @20% |
|---|---|---|---|---|---|
| Example 15 (k) | PEG2 | 3 | 17,300 | 48,900 | 7,500 |
| Example 15 (l) | PEG1 | 3 | 18,800 | 30,000 | 4,360 |
| Example 15(m) | PEG1 | 3 | 19,300 | 31,100 | 5,650 |
| Example 15 (n) | PEG1 | 5 | 21,800 | 38,000 | 9,800 |

TABLE 8-continued

EPDIOL-PEG1-HDI-Decanol- HEUR

| Example | PEG | Target nEPDIOL | Mn | Mw | B.V @20% |
|---|---|---|---|---|---|
| Example 15 (o) | PEG1 | 5 | 19.400 | 32,100 | 6,820 |
| Example 15 (p) | PEG1 | 3 | 20,500 | 32,800 | 30,950 |

Example 15 (d): Solvent Process

EPDIOL (12.69 g) of in 15 g anhydrous acetone was charged to a process reactor along with 188.96 g of PEG2 and 175.0 g of anhydrous acetone. The reaction mixture is mixed and heated to 65-70° C. Further, a mixture of 21.05 g HDI in 15 g anhydrous acetone was mixed for 5-15 minutes at the temperature. Then 0.453 g DBTDL in 10 g acetone was charged to the reaction mixture. The reaction mixture was mixed for 5 hours. Further, 2.53 g hexanol was added to the reaction mixture and the reaction is continued for 1.0 hours. At the end of the reaction the product was discharged and the product was either dried in a vacuum oven or solvent exchange into water.

Example 15(l): Melt Process

EPDIOL (18.88 g) and polyethylene glycol (PEG) were charged to a process reactor. Heated the reaction mixture to 100-110° C. and stirred under vacuum for 0.5-1.0 hours. Cooled to 75-80° C. and charged HMDI (89.30 g) and mixed for 5-15 minutes. Afterwards, dibutyltin dilaurate (1.92 g) was charged and mixed for 2.5 hours at 100-110° C. Once mixing is complete, hexanol (16.83 g) was charged and continued reaction for 1.0 hours. After reaction is completed contents were discharged and allowed to cool to ambient temperature to obtain product.

Application of EPDIOL-HEUR Examples in Coatings:

Example 16: Base Paint Preparation

A semi-gloss base paint formulation without low shear and high shear thickeners was prepared by mixing the grind formulation given in Table 9A and letdown formulations given in Table 9B. During the let-down phase, low shear polymer, high-shear polymer examples and water were withheld.

TABLE 9A

Grind Formulation

| Ingredient Grind formulation | Raw Material | Pounds | Gallons | Density |
|---|---|---|---|---|
| 1 | Water | 151.20 | 18.15 | 8.33 |
| 2 | 1,2-benzisothiazolin-3-one | 0.21 | 0.13 | 8.76 |
| 3 | Ammonium Hydroxide (28%) | 1.50 | 0.17 | 8.70 |
| 4 | Sodium salt of a maleic anhydride copolymer | 8.00 | 0.87 | 9.20 |

TABLE 9A-continued

Grind Formulation

| Ingredient Grind formulation | Raw Material | Pounds | Gallons | Density |
|---|---|---|---|---|
| 5 | Neutralized (potassium salt) form of an ethoxylated aliphatic alcohol phosphate ester | 2.00 | 0.22 | 9.20 |
| 6 | Drewplus T-4304 | 3.00 | 0.38 | 8.00 |
| 7 | Neutralized (potassium salt) form of a phosphate coester of aliphatic alcohols | 2.00 | 0.22 | 9.20 |
| 8 | Titaniun dioxide | 250 | 7.51 | 33.30 |
| 9 | Minex 7 | 15 | 0.69 | 21.70 |
| 10 | A hydrous magnesium aluminum silicate | 1.75 | 0.06 | 28 |

Grind for 15 minutes to achieve a Hegman scale 4-5

Drewplus ™ T-4304: A defoamer, commercially available from Ashland Inc.

Minex ® 7: Micronized functional filler having a median particle size of 3.5 microns, commercially available from The Cary Company.

TABLE 9B

Letdown Formulation

| Ingredient | Raw Material | Pounds | Gallons | Density |
|---|---|---|---|---|
| 11 | Rhoplex VSR 1050 | 500 | 56.56 | 8.84 |
| 12 | Optifilm Enhancer 400 | 8 | 0.99 | 8.07 |
| 13 | Drewplus T-4304 | 2 | 0.25 | 7.93 |
| 14 | Polyphase 678 | 3 | 0.31 | 9.68 |
| Leave out | Water | 83.95 | 10.08 | 8.33 |
| Leave out | High shear polymer | 24 | 2.77 | 8.66 |
| Leave out | Aquaflow XLS 530 (Low shear polymer) | 5 | 0.57 | 8.7 |

Rhoplex VS 1050: acrylic emulsion from Dow Chemical company

OptifilmTM Enhancer 400: a coalescent, commercially available from Eastman Chemical Company.

Polyphase 678: a fungicide, commercially available from Troy Corporation.

Example 17: EPDIOL HEUR Polymer Compositions

TABLE 10

EPDIOL HEUR polymer compositions

| Example | Polymer | Type of Isocyanate | Type of Hydophobe | nEPDIOL | PEG | $M_n$ | $M_w$ |
|---|---|---|---|---|---|---|---|
| Example 17 (a) (control) | C6HMD1 | HMDI | C6-alcohol | 0 | 8K | 19,400 | 31,600 |
| Example 17 (b) | C10 EPDIOL IPDI | IPDI | C6-alcohol | 6 | 4K | 19,437 | 36,834 |
| Example 17 (c) | C6 PDIOL HMDI | HMDI | C6-alcohol | 1 | 8K | 22,800 | 38,900 |
| Example 17 (d) | C10 EPDIOL HDI | HDI | C10-alcohol | 5 | 8K | 21,800 | 38,000 |
| Example 17 (e) | C10 EPDIOL HDI | HDI | C10-alcohol | 3 | 8K | 19,300 | 31,100 |

Example 18 (a): Comparative Control Example 1-Semi-Gloss Formulation

In comparative control Example 17(a) Aquaflow XLS 530 was added as low-shear (LS) polymer and Acrysol RM2020 (C6 HMDI) was added as high-shear (HS) polymer along with water to the base paint formulation shown in table 9A and 9B. The dosages of LS, HS polymers and water were adjusted to achieve a target Krebs stormer viscosity of 105±5 KU units and an ICI viscosity of 130±10 m·Pa·s.

Example 19: Semi-Gloss Formulation

In comparative Example 17(b), Aquaflow XLS 530 was added as low-shear (LS) polymer and polymer solution example 17 (b) was added as high-shear (HS) polymer along with water to the base paint formulation shown in table 9A and 9B. The dosages of LS, HS polymers and water were adjusted to achieve a target Krebs stormer viscosity of 105±5 KU units and an ICI viscosity of 130±10 m·Pa·s.

Example 20: Semi-Gloss Formulation

In comparative Example 17(c), Aquaflow XLS530 was added as low-shear (LS) polymer and polymer solution Example 17 (c) was added as high-shear (HS) polymer along with water to the base paint formulation shown in table 9A and 9B. The dosages of LS, HS polymers and water were adjusted to achieve a target Krebs stormer viscosity of 105±5 KU units and an ICI viscosity of 130±10 m·Pa·s.

Example 21: Semi-Gloss Formulation

In comparative Example 17(d), Aquaflow XLS530 was added as low-shear (LS) polymer and Polymer solution Example 17 (d) was added as high-shear (HS) polymer along with water to the base paint formulation shown in Table 9A and 9B. The dosages of LS, HS polymers and water were adjusted to achieve a target Krebs stormer viscosity of 105±5 KU units and an ICI viscosity of 130±10 m·Pa·s.

Example 22: Semi-Gloss Formulation

In comparative Example 17(e) Aquaflow XLS530 was added as low-shear (LS) polymer and polymer solution Example 17 (e) was added along with water to the base paint formulation shown in table 9A and 9B. The dosages of LS, HS and water were adjusted to achieve a target Krebs stormer viscosity of 105±5 KU units and an ICI viscosity of 130±10 m·Pa·s.

Example 23: Wet Paint Properties

TABLE 11

Wet Paint properties

| High Shear polymer Solution # | High Shear Description | Stormer Viscosity (KU) | ICI Viscosity (m · Pa · s) | Brookfield Viscosity Spindle 5 @ 30 rpm (m · Pa · s) | Sag | Leveling |
|---|---|---|---|---|---|---|
| Example 23 (a) control | C6 HMDI (ACRYSOL RM2020) | 105 | 145.2 | 5,133 | 18 | 9 |
| Example 23 (b) | C10 EPDIOL IPDI | 110 | 127.1 | 4,307 | 14 | 9 |
| Example 23 (c) | C6 EPDIOL HMDI | 100 | 125.0 | 2,587 | 12 | 9 |
| Example 23 (d) | C10 EPDIOL HDI | 95 | 133.3 | 2,040 | 10 | 9 |
| Example 23 (e) | C10 EPDIOL HDI | 103 | 132.5 | 3,933 | 14 | 9 |

Example 24: Dry Film Properties

TABLE 12

Dry film properties

| Formulation example | High Shear Description | Gloss 20° | Gloss 60° | Gloss 85° |
|---|---|---|---|---|
| Example 24 (a) (control) | C6 HMDI | 11.2 | 43.3 | 78.6 |
| Example 24 (b) | C10 EPDIOL IPDI | 14 | 48.1 | 81.8 |
| Example 24 (c) | C6 EPDIOL HMDI | 14.4 | 49.2 | 81.4 |
| Example 24 (d) | C10 EPDIOL HDI | 14.8 | 50.5 | 83.1 |
| Example 24 (e) | C10 EPDIOL HDI | 16.1 | 52.1 | 83.4 |

Test Methods

Stormer viscosity is measured by a Stormer viscometer as per the standard test method ASTM D562 and expressed in Kreb Units (KU).

ICI viscosity is measured by an ICI cone and plate viscometer as per the standard test method ASTM D4287 expressed in Poise (P).

Brookfield viscosity is measured on a Brookfield viscometer using spindle 5 at 30 RPM.

Sag resistance is measured on a Leneta chart based on the standard ASTM D4400 using a mid-range bar. Wet film thickness (WFT) in mils above which sag occurs is measured.

Leveling is measured based on a Leneta chart based on the standard ASTM D4062 method on a scale of 0-10; 0 is worst and 10 is best.

Gloss is measured using a spectrophotometer at 60° and 80° angles.

Table 11 and Table 12 gives the wet paint properties and dry film properties of polymer examples of the present disclosure. The results indicate that the polymers from the present disclosure presents good sag/level balance and gloss properties.

Table 12: shows the dry film properties of the examples presented in this disclosure. The polymers presented in the present disclosure show higher gloss and good sag/level balance.

While this invention has been described in detail with reference to certain preferred embodiments, it should be appreciated that the present invention is not limited to those precise embodiments. Rather, in view of the present disclosure, many modifications and variations would present themselves to those skilled in the art without departing from the scope and spirit of this invention.

What is claimed is:

1. A polymer obtained from a reaction mixture comprising:
   (i) at least one dihydroxy lactam moiety; and
   (ii) at least one functional moiety having a hydroxyl-reactive functional group;
   wherein (i) and (ii) are independently present in amounts of about 0.01 mole % to about 99.99 moles % and the polymer is selected from a group consisting of polyester, polycarbonate, polyether, poly (ester ether), poly (ester amide), poly imide, polyamide, poly acrylates and poly (ester imide); or wherein each (i) and (ii) is present in amounts of other than 50 mole % and wherein the polymer is a polyurethane, wherein said dihydroxy lactam moiety has a structure:

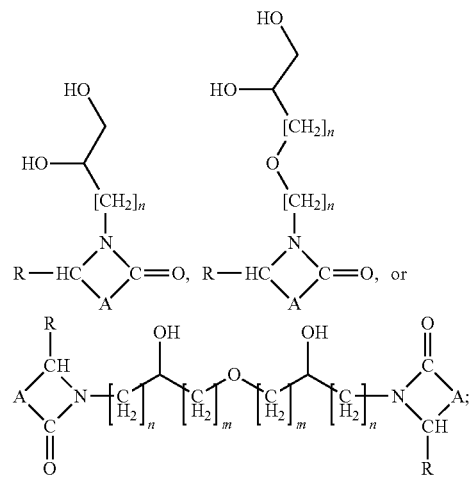

wherein "R" is independently selected from the group consisting of hydrogen, functionalized and unfunctionalized alkyl, cycloalkyl, alkenyl, and aryl groups, wherein any of the aforementioned groups can be with or without heteroatoms and linear or branched;
"A" is an alkylene or alkenylene group comprising 2 to 50 carbon atoms; and
wherein 2 to 4 carbon atoms reside in the lactam ring between the

group and the

group;
"n" is an integer ranging from 1 to 6; and "m" is an integer ranging from 0 to 6, provided that the dihydroxy lactam moiety of structure (I) excludes the following compound:

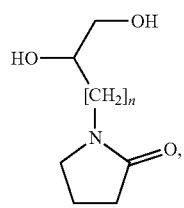

wherein at least one of the following is excluded:
(i) the structure (II) excludes the structure 1-[2-(2,3-dihydroxypropyloxy)ethyl]-2-pyrrolidone,
(ii) at least one functional moiety having a hydroxyl-reactive functional group having the structure of N-ethylpyrrolidone glycidyl ether (EPGE),
(iii) or both (i) and (ii),
wherein the reaction mixture further comprises one or more non-lactam moieties selected from the group consisting of functionalized/unfunctionalized compounds of aliphatic/aromatic alcohols with a carbon chain length of $C_1$-$C_{18}$, alkoxylated alcohols with a carbon chain length of $C_1$-$C_{18}$ alcohol, ethylene glycols, alcohol meth (acrylates), polyvinyl alcohols, polycarbonatepolyols, polybutylene glycols, polyethylene glycol, polypropylene glycols, hydroxypolyesters, hydroxypolyethers, hydroxypolythioesters, hydroxypolyacetals, hydroxypolycarbonates, polyetherpolyols, polyesterpolyols, polycarbonatepolyols, hydroxypolyesters, hydroxypolyethers, hydroxypolythioesters, hydroxypolyacetals, hydroxypolycarbonates, aliphatic and aromatic polyether polyols, caprolactone-based polyols, poly(ethylene glycol)-soyamine, poly(ethylene glycol)-castor oil, poly(ethylene glycol)-hydrogenated castor oil, poly(ethylene glycol)-lanolin, poly(ethylene glycol)-lanolin wax, poly(ethylene glycol)-polyvinylidene fluoride, poly(ethylene glycol)-poly(vinyl acetate), poly(ethylene glycol)-polyoxymethylene, poly(ethylene glycol)-ester, and a combination thereof.

2. The polymer according to claim 1, wherein said dihydroxy lactam moiety is selected from the group consisting of:

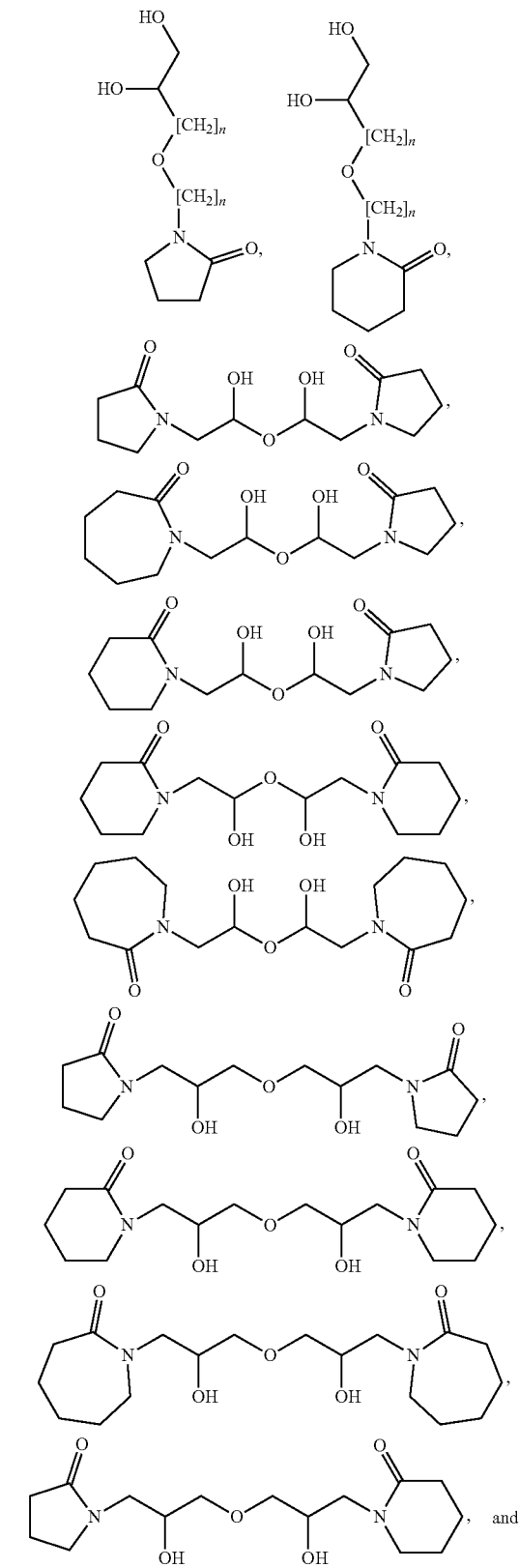

-continued

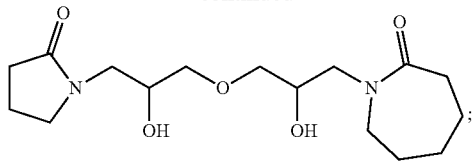 [SMILES: O=C1CCCCCN1CC(O)COCC(O)CN1CCCC1=O]

wherein "n" is an integer ranging from 1 to 6; and "m" is an integer ranging from 0 to 6, further comprising at least one of the following is excluded:
(i) the structure 1-[2-(2,3-dihydroxypropyloxy)ethyl]-2-pyrrolidone, or
(ii) at least one functional moiety having a hydroxyl-reactive functional group having the structure of N-ethylpyrrolidone glycidyl ether (EPGE).

3. The polymer according to claim 2, wherein said dihydroxy lactam moiety is 1-[2-(2,3-dihydroxypropyloxy)ethyl]-2-pyrrolidone, provided that the at least one functional moiety having a hydroxyl-reactive functional group having the structure of N-ethylpyrrolidone glycidyl ether (EPGE) is excluded.

4. The polymer according to claim 1, wherein the functional moiety is selected from the group consisting of: (a) carbamates, (b) acyl halides, (c) sulfonyl halides, (d) isothiocyanates, (e) cyanoacrylates, (f) isocyanates, (g) oxiranes, (h) imines, (i) thiocarbonates, (j) thiols, (k) aldehydes, (l) aziridines, (m) acids and their anhydrides, (n) azides, (o) phosphorus halides with alcohols, (p) esters, (q) amines, (r) alkyl halides, (s) dihalogenomethanes and combinations thereof.

5. The polymer according to claim 1, wherein said functional moiety is selected from the group consisting of:
(a) hydroxyethyl carbamate, hydroxypropyl carbamate, hydroxybutyl carbamate and combinations thereof;
(b) acryloyl chloride, succinyl chloride, methacryloyl chloride, crotonoyl chloride, benzoyl chloride, cinnamoyl chloride, hydrocin namoyl chloride, acetyl chloride, 2-acetoxyacetyl chloride, diphenylacetyl chloride, 2-methoxybenzoyl chloride, 3,4,5 trimethoxybenzoyl chloride, 3,4 (methylenedioxy)benzoyl chloride, cyclopropanecarbonyl chloride, pentadecenoyl chloride, 2-cyclohexene-1-carbonyl chloride, 2-thiopheneacetyl chloride and combinations thereof;
(c) methane sulfonyl chloride, benzenesulfonyl chloride and combinations thereof;
(d) methyl isothiocyanate, allyl isothiocyanate, aryl isothiocyanates and combinations thereof;
(e) ethyl cyanoacrylate, N-butyl-cyanoacrylate (NBCA), 2-ocytyl-cyanoacrylate (2-OCA) and combinations thereof;
(f) hexamethylene diisocyanate, toluene diisocyanate (TDI), diphenylmethane diisocyanate (MDI), m-phenylene diisocyanate, p-phenylene diisocyanate, bitolylene diisocyanate, cyclohexane diisocyanate (CHDI), bis-(isocyanatomethyl) cyclohexane (H6XDI), dicyclohexylmethane diisocyanate (H12MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives, polymethylene polyphenyl isocyanates, chlorophenylene-2,4-diisocyanate, polyphenylene diisocyanate, isophorone diisocyanate (IPDI), hydrogenated methylene diphenyl isocyanate (HMDI), tetramethyl xylene diisocyanate (TMXDI), hexamethylene diisocyanate (HDI), and their respective dimers, trimers and oligomers;
(g) ethylene oxide (EO), propylene oxide (PO), butylene oxide, 1-octene oxide, cyclohexene oxide, styrene oxide, bisphenol A diglycidyl ether, diglycidyl ether, epichlorohydrin, glycidic acid, allyl glycidyl ether ([(2-propenyloxy)methyl]-oxirane), glycidyl (meth)acrylate, vinylcyclohexene diepoxide, 3,4-epoxycyclohexylmethyl 3,4-epoxycyclohexane carboxylate, 3,4-epoxy-6-methylcyclohexylmethyl 3,4-epoxy-6-methylcyclohexane carboxylate, dipentene dioxide, 2-(3,4-epoxycyclohexyl-5,5-spiro-3,4-epoxy)cyclohexane meta-dioxane, and combinations thereof;
(h) polyaldimines, hydroxyaldimines, polyketimines, hydroxyketimines, and combination thereof;
(i) bis-(phenylthiocarbonyloxymethyl) esters, bis-(isopropylthiocarbonyloxymethyl) esters, and combinations thereof;
(j) glutathione, 3-acetyl-thiol propionic acid, thio anhydride, thio acid, and combinations thereof;
(k) acetaldehyde diethyl acetyl, propionaldehyde diethyl acetyl, di(acetaldehyde diethylacetal), chloroacetaldehyde diethyl acetal, and combinations thereof;
(l) 2,2-bis-hydroxymethylbutanol tris-[3-(1-aziridinyl) propionate], bis-N-aziridinomethane, and combinations thereof;
(m) maleic acid, maleic anhydride, fumaric acid, citric acid, alkenylsuccinic anhydrides, phthalic anhydride, terephthalic acid, succinic anhydride, tetrahydrophthalic anhydride, maleic anhydride copolymers, and combinations thereof;
(n) azide-functionalized DNA, azide-functionalized peptides, azide-functionalized proteins, azide-functionalized sugars, azide-functionalized metal, azide-functionalized nanoparticles, azide-functionalized antimicrobials, isodium 4,4'-diazidostilbene-2,2'-disulfonate, aromatic bisazide compound, calcium azide, 4,4-diphenyldisulfonyl azide and p-toluenesulfonyl azide, and combinations thereof;
(o) phosphorus oxychloride, phosphorus oxybromide, and combinations thereof;
(p) dimethyl itaconate, di-n-butyl itaconate, vinyl hexanoate, glycolide, ε-caprolactone, γ-caprolactone, poly(D, L-lactide), poly(D-lactide), poly(L-lactide), poly(ε-caprolactone), poly(γ-caprolactone), polyglycolide, valerolactone, butralactone, polyether-polyester, polyanhydride-diol-polyester, and combinations thereof;
(q) amino alcohols, methylamine, ethylamine, hexylamine, isopropylamine, isobutylamine, amylamines, cyclohexylamine, octylamine, benzylamine, dimethylamine, diethylamine, dipropylamine, dibutylamine, diphenylamine, dibenzylamine, ethylmethylamine, N-methylaniline, ethylenediamine, propylenediamine, butylenediamine, hexamethylenediamine, cyclohexylenediamine, piperazine, toluenediamine, isophoronediamine, N,N-dimethylaniline, N,N-dimethyl-1-naphthylamine, N,N-dimethyl-p-toluidine, N,N-diethylaniline, N,N-diallylaniline, 1-phenylpiperidine, and 4-phenylmorpholine, amino-ethoxylates, cocamine, soyamine and combinations thereof,
(r) bromohexanes, bromododecane, bromohexadecane, 1-bromooctadecane and combinations thereof, and
(s) dibromomethane, dichloromethane and combinations thereof.

6. The polymer according to claim 1, wherein said polymer has an average molecular weight ranging from about 3000 g/mol to about 1,000,000 g/mol.

7. A polymer obtained from a reaction mixture according to claim 1 comprising:
   (i) 1-[2-(2,3-dihydroxypropyloxy)ethyl]-2-pyrrolidone, and
   (ii) poly(D, L-lactide);
wherein (i) and (ii) are independently present in amount of about 0.01 mole % to about 99.99 moles % and the polymer is a polyester,
wherein at least one functional moiety having a hydroxyl-reactive functional group having the structure of N-ethylpyrrolidone glycidyl ether (EPGE) is excluded.

8. A polymer obtained from a reaction mixture according to claim 1 comprising:
   (i) 1-[2-(2,3-dihydroxypropyloxy)ethyl]-2-pyrrolidone, and
   (ii) a) isophorone diisocyanate, b) polyethylene glycol, and optionally c) octanol;
wherein each (i) and (ii) is present in an amount of other than 50 mole % and the polymer is a polyurethane,
wherein at least one functional moiety having a hydroxyl-reactive functional group having the structure of N-ethylpyrrolidone glycidyl ether (EPGE) is excluded.

9. A polymer comprising:
   (i) at least one moiety comprising a lactam moiety that is fused to a functional moiety having a hydroxyl-reactive functional group;
   wherein the polymer is selected from a group consisting of polyester, polycarbonate, polyether, poly(ester ether), poly(ester amide), poly imide, polyamide, poly acrylates and poly (ester imide); or wherein each of the lactam moiety and the functional moiety are present in amounts of other than 50 mole % and wherein the polymer is a polyurethane, wherein said dihydroxy lactam moiety has a structure:

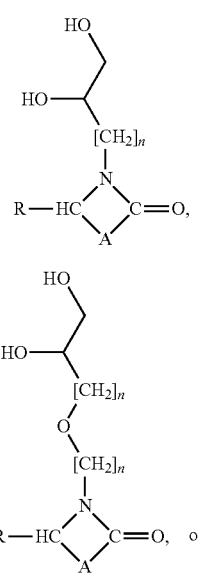

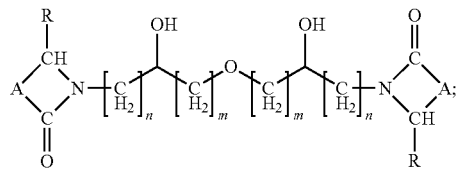

wherein "R" is independently selected from the group consisting of hydrogen, functionalized and unfunctionalized alkyl, cycloalkyl, alkenyl, and aryl groups, wherein any of the aforementioned groups can be with or without heteroatoms and linear or branched;

"A" is an alkylene or alkenylene group comprising 2 to 50 carbon atoms; and wherein 2 to 4 carbon atoms reside in the lactam ring between the

group and the

group;

"n" is an integer ranging from 1 to 6; and "m" is an integer ranging from 0 to 6, provided that the dihydroxy lactam moiety of structure (I) excludes the following compound:

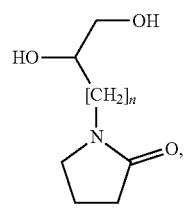

wherein at least one of the following dihydroxy lactam moiety is excluded: structure (II), 1-[2-(2,3-dihydroxypropyloxy)ethyl]-2-pyrrolidone.

10. The polymer according to claim 9, wherein said dihydroxy lactam moiety is selected from the group consisting of:

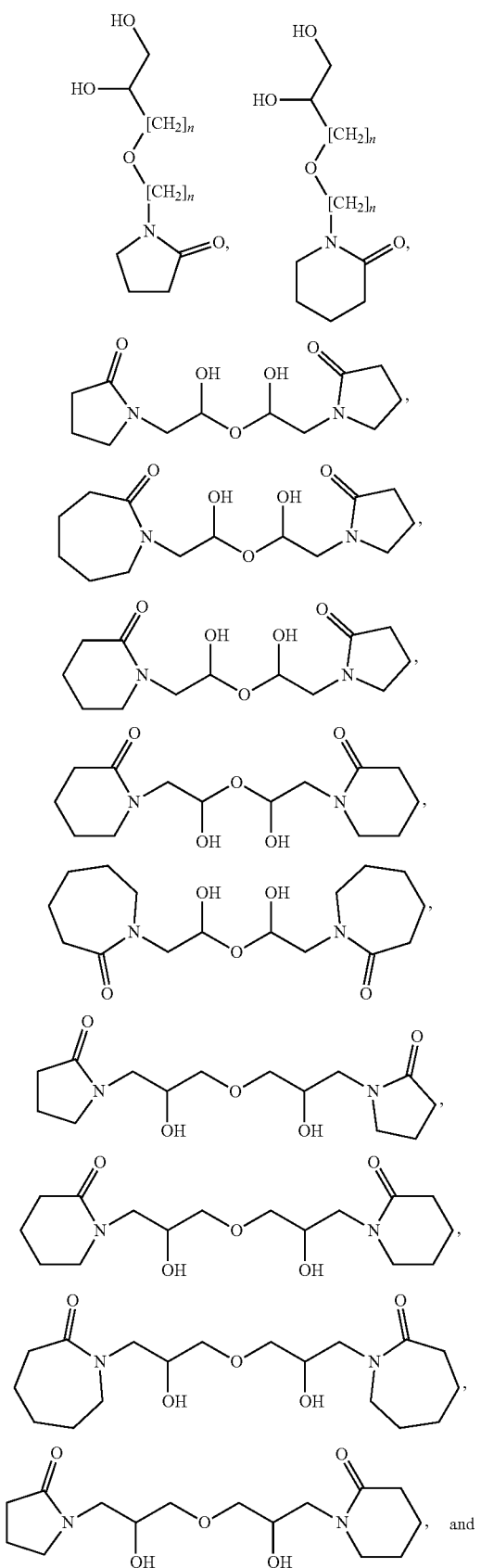

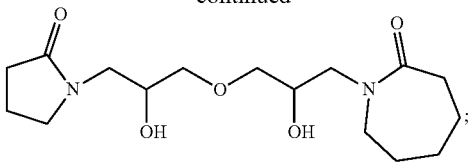

wherein "n" is an integer ranging from 1 to 6; and "m" is an integer ranging from 0 to 6, further comprising at least one of the following is excluded:
(iii) the structure 1-[2-(2,3-dihydroxypropyloxy)ethyl]-2-pyrrolidone, or
(iv) at least one functional moiety having a hydroxyl-reactive functional group having the structure of N-ethylpyrrolidone glycidyl ether (EPGE).

11. The polymer according to claim 10, wherein said dihydroxy lactam moiety is 1-[2-(2,3-dihydroxypropyloxy)ethyl]-2-pyrrolidone, provided that the at least one functional moiety having a hydroxyl-reactive functional group having the structure of N-ethylpyrrolidone glycidyl ether (EPGE) is excluded.

12. The polymer according to claim 9, wherein the functional moiety is selected from the group consisting of: (a) carbamates, (b) acyl halides, (c) sulfonyl halides, (d) isothiocyanates, (e) cyanoacrylates, (f) isocyanates, (g) oxiranes, (h) imines, (i) thiocarbonates, (j) thiols, (k) aldehydes, (l) aziridines, (m) acids and their anhydrides, (n) azides, (o) phosphorus halides with alcohols, (p) esters, (q) amines, (r) alkyl halides, (s) dihalogenomethanes and combinations thereof.

13. The polymer according to claim 9, wherein said functional moiety is selected from the group consisting of:
(a) hydroxyethyl carbamate, hydroxypropyl carbamate, hydroxybutyl carbamate and combinations thereof;
(b) acryloyl chloride, succinyl chloride, methacryloyl chloride, crotonoyl chloride, benzoyl chloride, cinnamoyl chloride, hydrocin namoyl chloride, acetyl chloride, 2-acetoxyacetyl chloride, diphenylacetyl chloride, 2-methoxybenzoyl chloride, 3,4,5 trimethoxybenzoyl chloride, 3,4 (methylenedioxy)benzoyl chloride, cyclopropanecarbonyl chloride, pentadecenoyl chloride, 2-cyclohexene-1-carbonyl chloride, 2-thiopheneacetyl chloride and combinations thereof;
(c) methane sulfonyl chloride, benzenesulfonyl chloride and combinations thereof;
(d) methyl isothiocyanate, allyl isothiocyanate, aryl isothiocyanates and combinations thereof;
(e) ethyl cyanoacrylate, N-butyl-cyanoacrylate (NBCA), 2-ocytyl-cyanoacrylate (2-OCA) and combinations thereof;
(f) hexamethylene diisocyanate, toluene diisocyanate (TDI), diphenylmethane diisocyanate (MDI), m-phenylene diisocyanate, p-phenylene diisocyanate, bitolylene diisocyanate, cyclohexane diisocyanate (CHDI), bis-(isocyanatomethyl) cyclohexane (H6XDI), dicyclohexylmethane diisocyanate (H12MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives, polymethylene polyphenyl isocyanates, chlorophenylene-2,4-diisocyanate, polyphenylene diisocyanate, isophorone diisocyanate (IPDI), hydrogenated methylene diphenyl isocyanate (HMDI), tetramethyl xylene diisocyanate (TMXDI), hexamethylene diisocyanate (HDI), and their respective dimers, trimers and oligomers;
(g) ethylene oxide (EO), propylene oxide (PO), butylene oxide, 1-octene oxide, cyclohexene oxide, styrene oxide, bisphenol A diglycidyl ether, diglycidyl ether, epichlorohydrin, glycidic acid, allyl glycidyl ether ([(2-propenyloxy)methyl]-oxirane), glycidyl (meth)acrylate, vinylcyclohexene diepoxide, 3,4-epoxycyclohexylmethyl 3,4-epoxycyclohexane carboxylate, 3,4-epoxy-6-methylcyclohexylmethyl 3,4-epoxy-6-methylcyclohexane carboxylate, dipentene dioxide, 2-(3,4-epoxycyclohexyl-5,5-spiro-3,4-epoxy)cyclohexane meta-dioxane, and combinations thereof;
(h) polyaldimines, hydroxyaldimines, polyketimines, hydroxyketimines, and combination thereof;
(i) bis-(phenylthiocarbonyloxymethyl) esters, bis-(isopropylthiocarbonyloxymethyl) esters, and combinations thereof;
(j) glutathione, 3-acetyl-thiol propionic acid, thio anhydride, thio acid, and combinations thereof;
(k) acetaldehyde diethyl acetyl, propionaldehyde diethyl acetyl, di(acetaldehyde diethylacetal), chloroacetaldehyde diethyl acetal, and combinations thereof;
(l) 2,2-bis-hydroxymethylbutanol tris-[3-(1-aziridinyl) propionate], bis-N-aziridinomethane, and combinations thereof;
(m) maleic acid, maleic anhydride, fumaric acid, citric acid, alkenylsuccinic anhydrides, phthalic anhydride, terephthalic acid, succinic anhydride, tetrahydrophthalic anhydride, maleic anhydride copolymers, and combinations thereof;
(n) azide-functionalized DNA, azide-functionalized peptides, azide-functionalized proteins, azide-functionalized sugars, azide-functionalized metal, azide-functionalized nanoparticles, azide-functionalized antimicrobials, isodium 4,4'-diazidostilbene-2,2'-disulfonate, aromatic bisazide compound, calcium azide, 4,4-diphenyldisulfonyl azide and p-toluenesulfonyl azide, and combinations thereof;
(o) phosphorus oxychloride, phosphorus oxybromide, and combinations thereof;
(p) dimethyl itaconate, di-n-butyl itaconate, vinyl hexanoate, glycolide, ε-caprolactone, γ-caprolactone, poly(D, L-lactide), poly(D-lactide), poly(L-lactide), poly(ε-caprolactone), poly(γ-caprolactone), polyglycolide, valerolactone, butralactone, polyether-polyester, polyanhydride-diol-polyester, and combinations thereof;
(q) amino alcohols, methylamine, ethylamine, hexylamine, isopropylamine, isobutylamine, amylamines, cyclohexylamine, octylamine, benzylamine, dimethylamine, diethylamine, dipropylamine, dibutylamine, diphenylamine, dibenzylamine, ethylmethylamine, N-methylaniline, ethylenediamine, propylenediamine, butylenediamine, hexamethylenediamine, cyclohexylenediamine, piperazine, toluenediamine, isophoronediamine, N,N-dimethylaniline, N,N-dimethyl-1-naphthylamine, N,N-dimethyl-p-toluidine, N,N-diethylaniline, N,N-diallylaniline, 1-phenylpiperidine, and 4-phenylmorpholine, amino-ethoxylates, cocamine, soyamine and combinations thereof,
(r) bromohexanes, bromododecane, bromohexadecane, 1-bromooctadecane and combinations thereof, and
(s) dibromomethane, dichloromethane and combinations thereof.

14. The polymer according to claim 9, wherein said polymer has an average molecular weight ranging from about 3000 g/mol to about 1,000,000 g/mol.

15. The polymer of claim 9, comprising:
a 1-[2-(2,3-dihydroxypropyloxy)ethyl]-2-pyrrolidone fused to poly(D, L-lactide),
wherein the polymer is a polyester having each component independently present in amount of about 0.01 mole % to about 99.99 mole %,
wherein at least one functional moiety having a hydroxyl-reactive functional group having the structure of N-ethylpyrrolidone glycidyl ether (EPGE) is excluded.

16. The polymer of claim 9, comprising:
1-[2-(2,3-dihydroxypropyloxy)ethyl]-2-pyrrolidone, and one of isophorone diisocyanate, polyethylene glycol, or optionally octanol;
wherein the polymer is a polyurethane, comprising each of the components present in an amount of the other not greater than 50 mole % and
wherein at least one functional moiety having a hydroxyl-reactive functional group having the structure of N-ethylpyrrolidone glycidyl ether (EPGE) is excluded.

17. A composition comprising the polymer of claim 9.

18. The composition of claim 17, further comprising an additive.

19. The composition according to claim 18, wherein the additive is selected from the group consisting of adhesives, aerosols, agricultural agents, anti-soil redeposition agents, batteries agents, beverages, biocides, biomaterials, cementing and construction agents, cleaning agents, paints and coating agents, rheology modifiers, conductive materials, cosmetic agents, dental agents, decorated pigments, detergents, dispersants, drugs, electronics, encapsulations, foods, hair care agents, household-industrial institutional agents, inks and coatings, interlaminate, lithographic solutions, membrane additive agents, metal working fluids, oilfield agents, paper sizing agents, polish, personal care agents, pharmaceuticals, pigment additives, plasters, plastics, textiles, lubricants, printing, refractive index modifiers, sequestrants, soil release agents, static control agents, and wood-care agents.

* * * * *